(12) United States Patent
Yoshikawa

(10) Patent No.: US 10,809,604 B2
(45) Date of Patent: Oct. 20, 2020

(54) PHOSPHOR WHEEL AND LIGHT CONVERSION DEVICE INCLUDING THE SAME

(71) Applicant: Panasonic Intellectual Property Management Co., Ltd., Osaka (JP)

(72) Inventor: Tsutomu Yoshikawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 84 days.

(21) Appl. No.: 16/149,395

(22) Filed: Oct. 2, 2018

(65) Prior Publication Data

US 2019/0146314 A1 May 16, 2019

(30) Foreign Application Priority Data

Nov. 14, 2017 (JP) .................................. 2017-219288
Sep. 13, 2018 (JP) .................................. 2018-171548

(51) Int. Cl.

| G03B 21/16 | (2006.01) |
|---|---|
| G03B 21/20 | (2006.01) |
| G03B 33/12 | (2006.01) |
| G02B 26/00 | (2006.01) |
| G03B 21/00 | (2006.01) |
| G02B 7/00 | (2006.01) |

(52) U.S. Cl.
CPC ........... *G03B 21/16* (2013.01); *G02B 26/008* (2013.01); *G03B 21/204* (2013.01); *G02B 7/008* (2013.01); *G03B 21/008* (2013.01); *G03B 33/12* (2013.01)

(58) Field of Classification Search
CPC combination set(s) only.
See application file for complete search history.

(56) References Cited

U.S. PATENT DOCUMENTS

| 8,496,352 B2* | 7/2013 | Bartlett | G03B 21/204 362/231 |
|---|---|---|---|
| 10,120,272 B1* | 11/2018 | Chang | G03B 21/204 |
| 2011/0149549 A1* | 6/2011 | Miyake | F21V 7/22 362/84 |
| 2011/0304830 A1* | 12/2011 | Kato | G03B 21/204 353/84 |
| 2014/0140038 A1* | 5/2014 | Gerets | G03B 21/16 362/84 |
| 2014/0354960 A1 | 12/2014 | Miyazaki | |

(Continued)

FOREIGN PATENT DOCUMENTS

| JP | 2004-197922 | 7/2004 |
|---|---|---|
| JP | 4728766 B | 7/2011 |

(Continued)

*Primary Examiner* — Leah Simone Macchiarolo
(74) *Attorney, Agent, or Firm* — Wenderoth, Lind & Ponack, L.L.P.

(57) ABSTRACT

A phosphor wheel includes a disk-shaped member that is rotated about a rotation axis, and a phosphor layer disposed on an outer face of the disk-shaped member. The disk-shaped member has a hollow-box structure that forms an enclosed space. A coolant is sealed in the enclosed space. The coolant evaporates to a gas state from a liquid state at more than or equal to a predetermined temperature. In the liquid state, a volume of the coolant is smaller than a capacity of the enclosed space. A light conversion device includes the phosphor wheel described above.

20 Claims, 26 Drawing Sheets

(56) References Cited

U.S. PATENT DOCUMENTS

2016/0139401 A1* 5/2016 Cheng .................. G02B 26/008
    359/891
2016/0348857 A1   12/2016 Miyata

FOREIGN PATENT DOCUMENTS

| JP | 5240521 B   | 7/2013 |
| JP | 2015-007751 | 1/2015 |
| JP | 2017-027685 | 2/2017 |

* cited by examiner

PHOSPHOR WHEEL AND LIGHT CONVERSION DEVICE INCLUDING THE SAME

BACKGROUND

1. Field of the Invention

The present disclosure relates to a phosphor wheel and a light conversion device including the same.

2. Description of the Related Art

A projection display apparatus, which is used for projection mapping or the like, widely uses a phosphor wheel in which a phosphor layer is disposed on one face of a circular plate, for example, as a device for converting a wavelength of light. The phosphor layer, which performs wavelength conversion, i.e., converts an emitted blue laser beam into green or orange light, generates a lot of heat when performing the conversion. Therefore, the phosphor layer is necessary to cool appropriately.

Unexamined Japanese Patent Publication No. 2017-27685 discloses a phosphor wheel. In the phosphor wheel, a sealed case is provided on one face of a circular plate. The sealed case encloses a lot of fluorescent substance particles and coolant thereinside. Further, the inside of the sealed case is configured by a gas flowing area and a liquid flowing part. In the gas flowing area, coolant is easy to flow because the coolant is vaporized by heat generated when the wavelength conversion is performed. In the liquid flowing part, a plurality of fine channels are provided such that liquefied coolant can flow therethrough. The plurality of fine channels are formed by gaps between fluorescent substance particles.

In the phosphor wheel of JP Publication No. 2017-27685, gaps are necessary to provide between fluorescent substance particles to form fine channels. This reduces density of fluorescent substance particles, so that wavelength conversion efficiency per area is decreased as compared with the case where the gaps are not provided.

SUMMARY OF THE INVENTION

The present disclosure provides a phosphor wheel of which cooling performance is improved without affecting wavelength conversion efficiency of light, and a light conversion device including the same.

The phosphor wheel in the present disclosure includes:
a disk-shaped member that is rotated about a rotation axis; and
a phosphor layer disposed on one face of the disk-shaped member.

The disk-shaped member has a hollow-box structure that forms an enclosed space.

A coolant is sealed in the enclosed space. The coolant evaporates to a gas state from a liquid state at more than or equal to predetermined temperature. In the liquid state, a volume of the coolant is smaller than a capacity of the enclosed space.

The present disclosure further provides a light conversion device including the phosphor wheel of the present disclosure.

According to the present disclosure, there can be provided a phosphor wheel of which cooling performance is improved without affecting its conversion efficiency, and a light conversion device including the same.

DETAILED DESCRIPTION OF THE PREFERRED EMBODIMENTS

Hereinafter, exemplary embodiments will be described, in detail, with reference to the drawings as necessary. However, description that is in more detail than necessary is occasionally omitted. For example, detailed description about already well-known matters and overlapped description about the substantially same configurations are occasionally omitted. This is because the following description is avoided from being unnecessarily redundant, and a person skilled in the art is made to easily understand the present disclosure.

The accompanying drawings and the following description are provided for a person skilled in the art to fully understand the present disclosure, and do not intend to limit the subject matter described in Claims.

First Exemplary Embodiment

A phosphor wheel device equipped with a phosphor wheel in accordance with a first exemplary embodiment of the present disclosure, a light conversion device, and a projector (projection display apparatus) 100 will be described.

1. Structure 1-1. Structure of Projector

Figure 1:
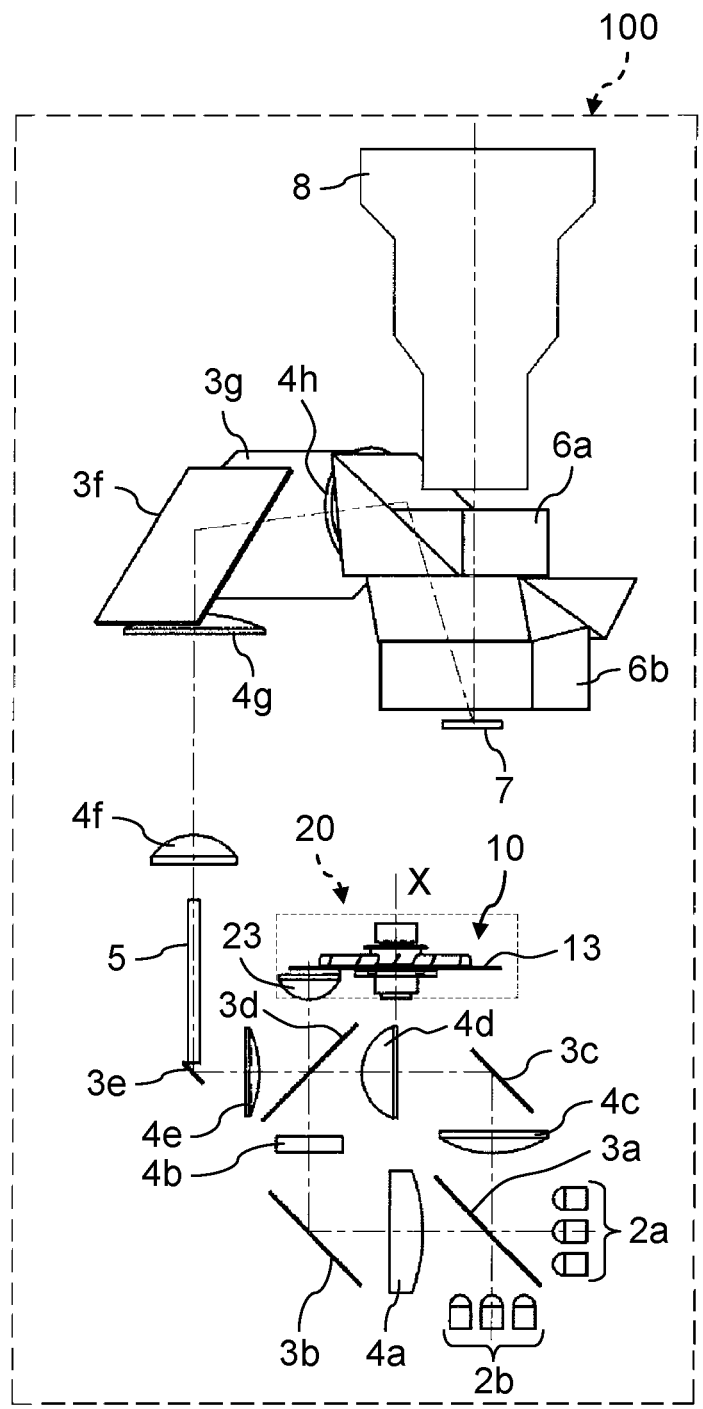
FIG. 1 is a schematic diagram showing a projection display apparatus in a first exemplary embodiment.

FIG. 1 is a view showing a schematic structure of a projector in accordance with a first exemplary embodiment of the present disclosure. Note that, FIG. 1 shows the projector (an example of a projection display apparatus) to which a phosphor wheel of the present disclosure is applied, and the phosphor wheel of the present disclosure is also applicable to projection display apparatuses having the other structures.

Projector 100 is a graphic display device of a DLP (Digital Light Processing) type in which a spatial-light-modulation element (for example, DMD (Digital Micromirror Device) 7 (display element)) is mounted to modulate light according to a video signal. Projector 100 includes blue LDs (laser diode) 2a and 2b (light source), various kinds of optical components, and light conversion device 20 including phosphor wheel device 10 that emits fluorescence excited by laser light.

Note that, projector 100 of the present exemplary embodiment employs a three-chip DLP method in which three DMDs 7 corresponding to three primary colors of R, G, and B, respectively, are mounted thereon, but FIG. 1 depicts only one DMD 7 for convenience of description.

As shown in FIG. 1, projector 100 of the present exemplary embodiment includes two blue LDs 2a and 2b as a light source. Further, as optical components, projector 100 includes separation mirror 3a, mirrors 3b and 3c, dichroic mirror 3d, mirrors 3e, 3f, and 3g, lenses 4a to 4h, rod integrator 5, TIR (Total Internal Reflection) prism 6a, color prism 6b, DMD 7, projection lens 8, and light conversion device 20.

Blue LDs 2a and 2b, which are the light source of projector 100, each are configured to include a plurality of LDs (m×n pieces) in vertical and horizontal directions. Further, blue LDs 2a and 2b are arranged such that their directions are orthogonal to each other. Thus, laser lights emitted from blue LDs 2a and 2b travel in directions orthogonal to each other.

Separation mirror 3a is provided near an intersection at which the laser lights emitted from two blue LDs 2a and 2b intersect with each other. By separation mirror 3a, the laser light emitted from each of blue LDs 2a and 2b is separated into two parts, which are deflected in two directions.

The laser lights, which are separated by separation mirror 3a and travel in the two directions, each are deflected at 90 degrees by mirrors 3b and 3c.

Dichroic mirror 3d, which is constituted by using special photonics materials, reflects light with one specific wavelength and passes light with the other wavelengths. In the present exemplary embodiment, dichroic mirror 3d reflects red light and green light, while passing the blue laser lights emitted from blue LDs 2a and 2b. Herein, the red light and green light are obtained by converting the blue laser lights in phosphor wheel device 10, described later.

Mirrors 3e, 3f, and 3g guide light of three primary colors R, G, and B, which pass through or reflect on dichroic mirror 3d, to projection lens 8 disposed on the most downstream side.

Lenses 4a to 4h converge or collimate the blue laser light, which are emitted from blue LDs 2a and 2b serving as the light source, and the red light and green light obtained by converting the blue laser light in phosphor wheel device 10.

Rod integrator 5 makes illumination of incidence light uniform. The light, which have entered rod integrator 5, repeats total internal reflection in an inner peripheral face of rod integrator 5, and are emitted from an emission face as uniform illumination light. Rod integrator 5 is provided such that the light reflected on mirror 3e enters rod integrator 5.

TIR (total internal reflection) prism 6a uses its total-internal-reflection function to change a direction in which incident light travels therein.

Color prism 6b divides the light, which has entered color prism 6b, into each light of three primary colors R, G, and B, and reflects them to three DMDs 7 that are disposed on its downstream side and corresponding to the respective colors.

Three DMDs 7 are provided to correspond to the three primary colors of R, G, and B one by one. Each of three DMDs 7 modulates the corresponding light, which has entered therein, according to a video signal and emits the modulated light to projection lens 8 through color prism 6b and TIR (total internal reflection) prism 6a.

Projection lens 8 is disposed on the most downstream side of optical components mounted on projector 100. By projection lens 8, the light that has entered projection lens 8 through TIR prism 6a, DMD 7, and color prism 6b is expanded and projected on a screen (not shown).

Light conversion device 20 is an apparatus that converts the blue laser lights emitted from blue LDs 2a and 2b, described later, into red light and green light through a fluorescent substance, and includes phosphor wheel device 10. Note that, a structure of light conversion device 20 including phosphor wheel device 10 will be described in detail in the later stage.

<Projection of an Image by Projector 100>

The laser lights emitted from two blue LDs 2a and 2b are separated into two parts, which are deflected in two directions, by separation mirror 3a disposed near an intersection at which the laser lights intersect with each other.

A first blue laser light, which is one of the two parts, passes through dichroic mirror 3d trough lens 4c, mirror 3c, and lens 4d. Subsequently, after passing through lens 4e, the first blue laser light is reflected at 90 degrees by mirror 3e, and enters rod integrator 5.

A second blue laser light passes through dichroic mirror 3d through lens 4a, mirror 3b, and lens 4b, and is emitted to phosphor layer 16 of phosphor wheel 13 in phosphor wheel device 10. At this time, red fluorescent substance and green fluorescent substance of phosphor layer 16 are excited by the second blue laser light, and emits red light and green light. In other words, the second blue laser light is converted into red light and green light.

At that time, phosphor wheel 13 is driven to rotate by motor 14 in order to disperse energy. This makes it possible to prevent the fluorescent substances from burning, when the red and green fluorescent substances are irradiated with the blue laser light.

In dichroic mirror 3d, the red light and green light, which are obtained by converting the second blue laser light, are reflected at 90 degrees and enter rod integrator 5.

The each light of three primary colors R, G, and B is mixed in rod integrator 5 and enters a boundary layer of TIR prism 6a through lens 4f, mirrors 3f and 3g, and lens 4h. The each light of three primary colors R, G, and B is reflected inside TIR prism 6a and travel to color prism 6b, because TIR prism 6a reflects light at a total-internal-reflection angle.

In color prism 6b, the each light of three primary colors R, G, and B are separated one by one, and each light enters a corresponding one of three DMDs 7.

Each light forming an image in DMD 7 and reflected is synthesized by color prism 6b, passes through the boundary layer of TIR prism 6a, and enters projection lens 8, so that the image is projected on a projection screen.

In projector 100 of the present exemplary embodiment, the blue laser lights emitted from blue LDs 2a and 2b, which serve as an excitation light source, excite red fluorescent substance and green fluorescent substance that are contained in phosphor layer 16 provided on a surface of phosphor wheel 13, and generate red light and green light. At this time, all of energies of the blue laser light are not converted into fluorescence luminescence, but a part of them is converted into thermal energy. This may increase temperature of the red fluorescent substance and the green fluorescent substance.

Herein, a fluorescent substance is likely to be deteriorated in optical conversion efficiency when temperature increases. Further, heat discoloration or the like may occur in a binder that fixes the fluorescent substance on phosphor wheel 13 to form phosphor layer 16. For that reason, phosphor wheel 13 is driven to rotate by motor 14 in order to prevent the increase in heat of the fluorescent substance.

As higher brightness is required for projector 100, however, the output of excitation light (laser light) is increased. Accordingly, phosphor layer 16 and the surrounding area thereof cannot be cooled sufficiently even if phosphor wheel 13 is driven to rotate. Therefore, it is necessary to blow cooling air over phosphor layer 16 and the surrounding area thereof to cool the fluorescent substance actively.

Therefore, in the present exemplary embodiment, which provides cooling means in phosphor wheel 13 itself, will be described, in detail, in the later stage.

1-2. Structure of Light Conversion Device

Figure 2:
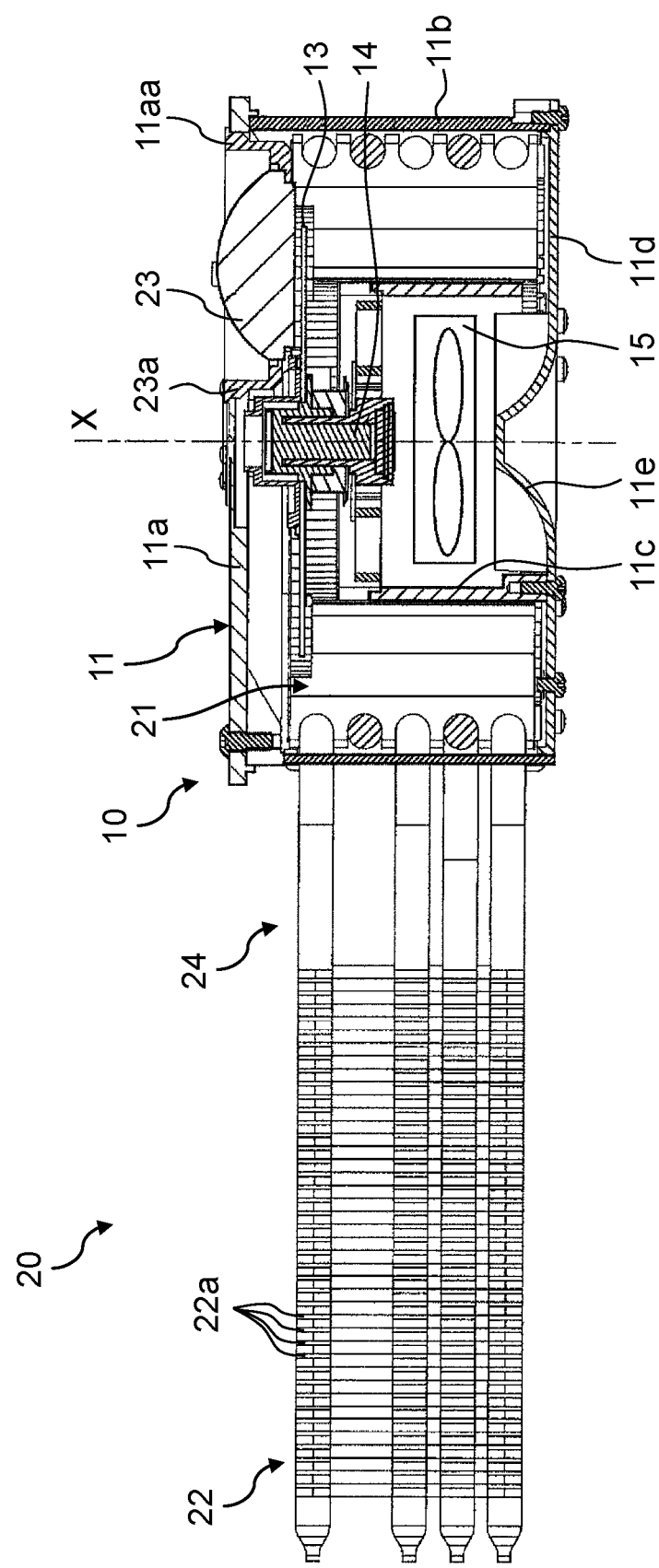
FIG. 2 is a cross-sectional view showing a structure of a principal part of a light conversion device.
Figure 3:
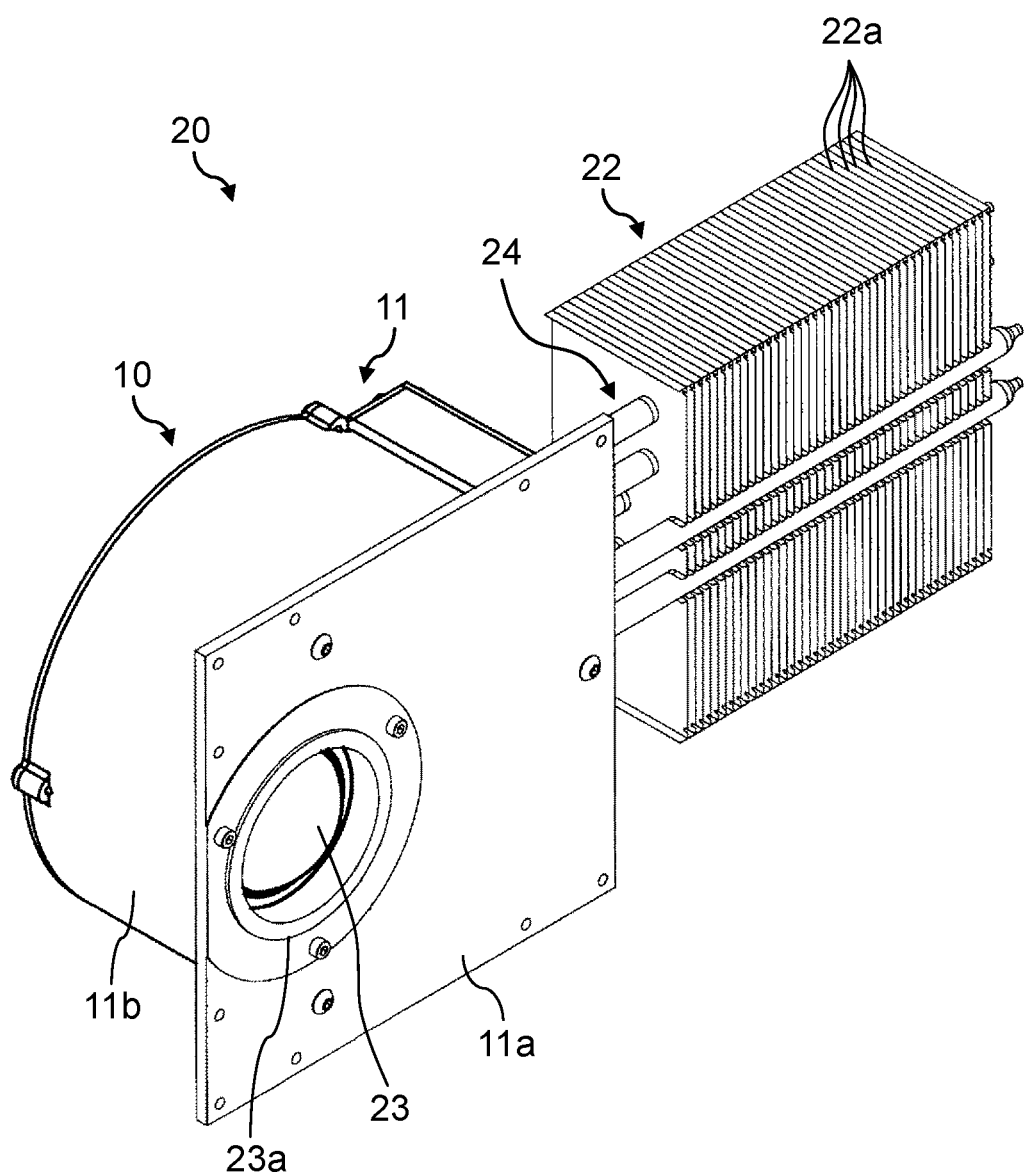
FIG. 3 is a perspective view of the light conversion device.
Figure 4A:
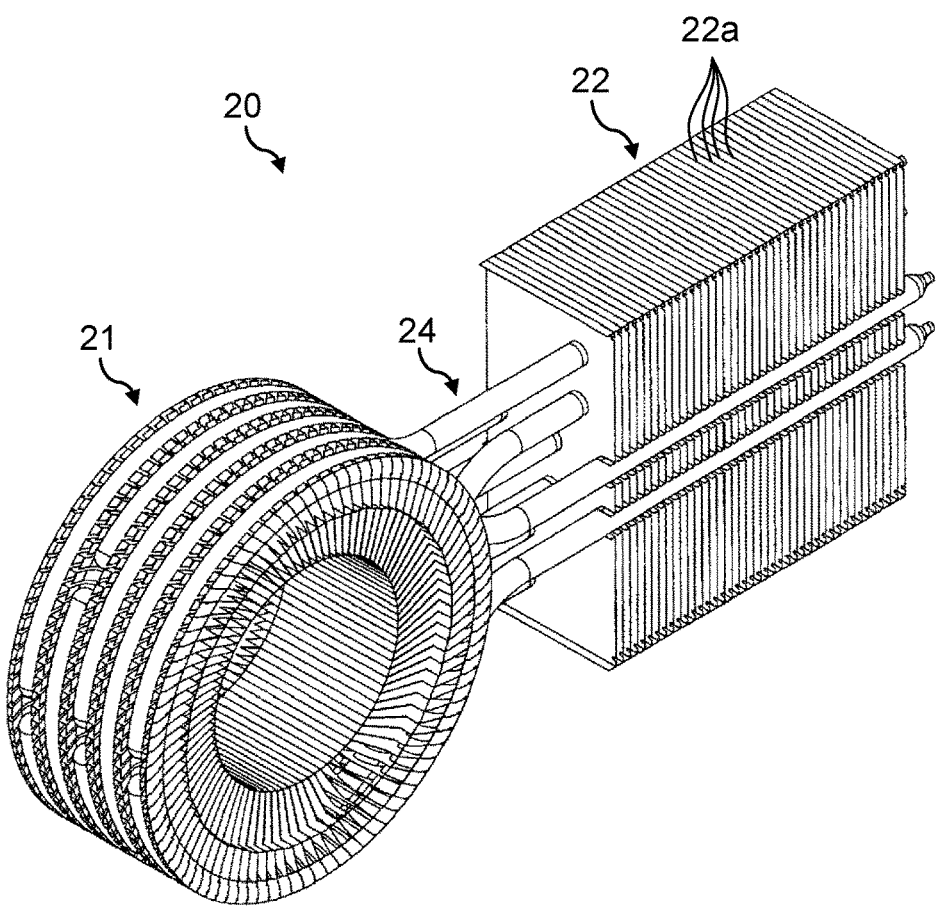
FIG. 4A is a perspective view showing a structure of a heat absorber disposed inside the light conversion device, and a heat dissipater thermally connected to the heat absorber.
Figure 4B:
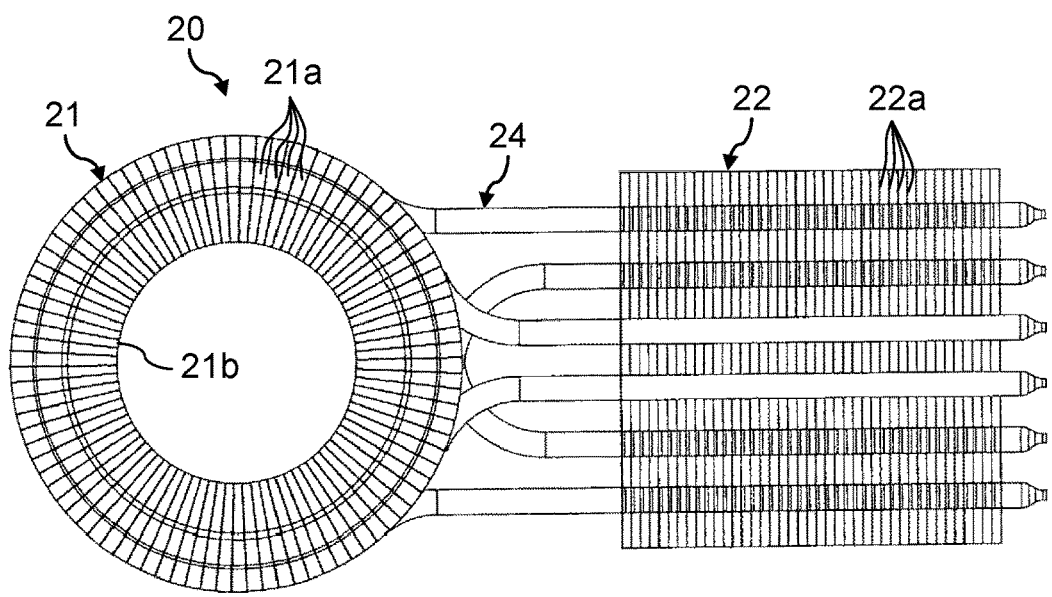
FIG. 4B is a plan view of the heat absorber and the heat dissipater in FIG. 4A.

A structure of the light conversion device will be described with reference to FIGS. 2, 3, 4A and 4B. FIG. 2 is a cross-sectional view showing a structure of a principal part of light conversion device 20. FIG. 3 is a perspective view of light conversion device 20. FIG. 4A is perspective views showing structures of a heat absorber disposed inside the light conversion device and a heat dissipater thermally connected to the heat absorber. FIG. 4B is a plan view of the heat absorber and the heat dissipater in FIG. 4A.

As shown in FIG. 2, light conversion device 20 includes phosphor wheel device 10 described later, heat absorber 21, heat dissipater 22, optical lens 23, and heat pipe 24.

Phosphor wheel device 10 converts the blue laser light into red light and green light by irradiating a fluorescent substance with blue laser lights emitted from blue LDs 2a and 2b. Note that, the detailed structure of phosphor wheel device 10 will be described in the later stage.

As shown in FIG. 2, heat absorber 21 is disposed inside casing unit 11 of phosphor wheel device 10. Heat absorber 21 has a fin structure through which airflow formed in light conversion device 20 passes, and absorbs heat from the airflow including heat generated in phosphor layer 16 of phosphor wheel 13. Heat absorber 21 is fixed to outer cylindrical portion 11b and bottom portion 11d with a screw. Herein, outer cylindrical portion 11b is included in casing unit 11 of phosphor wheel device 10 shown in FIG. 3. Further, as shown in FIGS. 4A and 4B, heat absorber 21 has a plurality of fins 21a, and is thermally connected to heat dissipater 22 via heat pipe 24.

A plurality of fins 21a are constituted by metal with high thermal conductivity, and radially arranged in a plan view, as shown in FIG. 4B.

Thus, the airflow that is blown near the center of phosphor wheel 13 can be guided outward in a radial direction. When being guided, the airflow passes through communicating part 11g between wall portion 21b of heat absorber 21 and phosphor wheel 13, and passes through a back side of an outer circumferential portion of phosphor wheel 13 on which phosphor layer 16 is disposed. This makes it possible to cool the heat generated in the fluorescent substance efficiently.

Further, when the airflow passes through between the plurality of fins 21a, temperature of the airflow can be reduced because the heat contained in the airflow is transferred to a fin 21a side.

As shown in FIG. 2, heat dissipater 22 is disposed outside casing unit 11 of phosphor wheel device 10. As shown in FIG. 3 or other figures, heat dissipater 22 is thermally connected to heat absorber 21 via heat pipe 24. Thus, the heat of the airflow, which is absorbed in heat absorber 21, is dissipated to the outside of casing unit 11. Further, heat dissipater 22 has a fin structure including a plurality of fins 22a disposed on an outer peripheral face of heat dissipater 22.

The plurality of fins 22a, which are constituted by metal with high thermal conductivity, are arranged along a direction perpendicular to a longitudinal direction of heat pipe 24, as shown in FIGS. 4A and 4B. Thus, the heat is dissipated to the outside air from casing unit 11.

As shown in FIGS. 2 and 3, optical lens 23 is attached to an opening portion formed in lid portion 11a of casing unit 11 via optical lens holding component 23a. As shown in FIG. 1, the excitation light that excites the fluorescent substance of phosphor layer 16 of phosphor wheel 13 passes through optical lens 23. In addition to this, the light emitted from the fluorescent substance of phosphor layer 16 is converged and guided to dichroic mirror 3d by optical lens 23.

As shown in FIGS. 4A and 4B, heat pipe 24 connects heat absorber 21 and heat dissipater 22 thermally. Inside heat pipe 24, a hollow space is formed. A small amount of water is enclosed in the hollow space. When receiving heat on a heat absorber 21 side, the water evaporates and moves to a heat dissipater 22 side as vapor. The vapor that has moved to the heat dissipater 22 side is cooled and liquefied in heat dissipater 22, and then turned into water. Herein, after the vapor is cooled on the heat dissipater 22 side and turned into water, the water is moved into the hollow space due to a capillary phenomenon, and returns back to heat absorber 21.

In other words, inside heat pipe 24, the small amount of water is evaporated on the heat absorber 21 side and liquefied on the heat dissipater 22 side, i.e., functions as a cooling medium.

1-3. Structure of Phosphor Wheel Device

Figure 5:
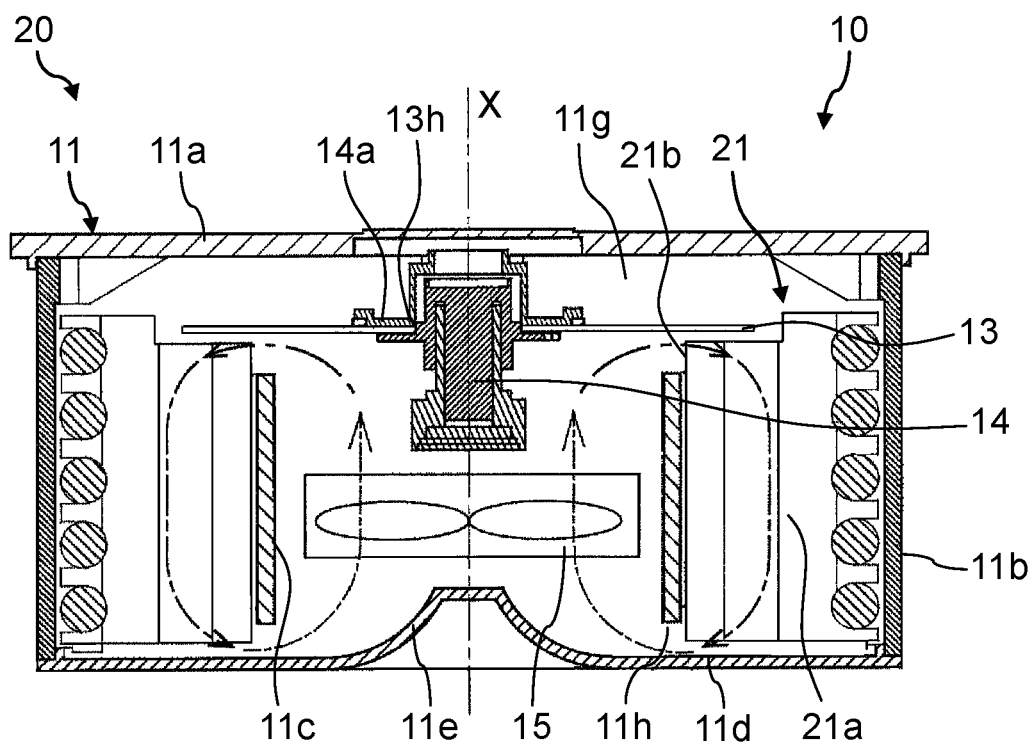
FIG. 5 is a cross-sectional view showing an inside structure of the light conversion device in FIG. 2.
Figure 6:
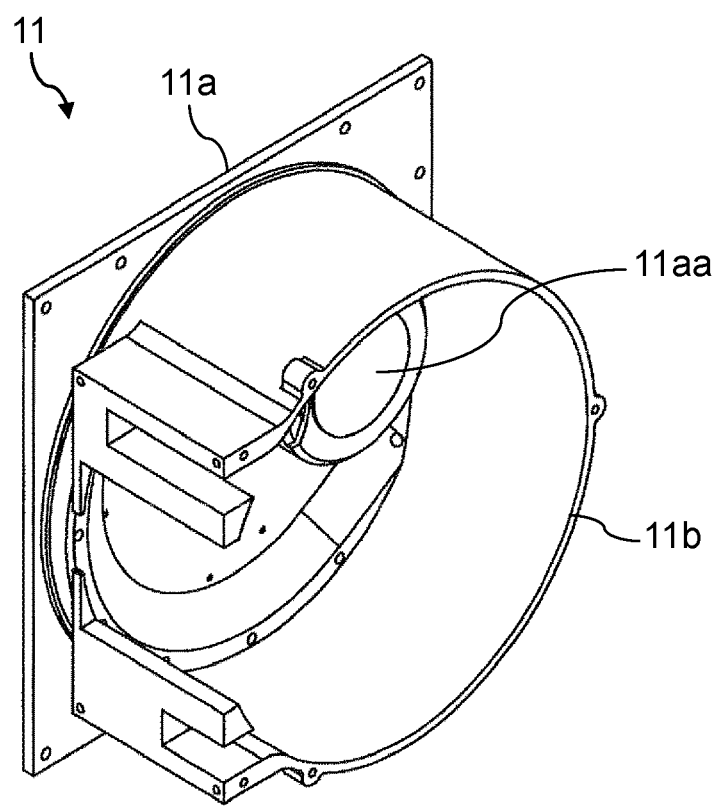
FIG. 6 is a perspective view showing a structure of a casing unit of the light conversion device in FIG. 2.

A structure of phosphor wheel device 10 will be described with reference to FIGS. 5 and 6, in addition to each of the above-mentioned figures. FIG. 5 is a cross-sectional view showing an inside structure of the light conversion device in FIG. 2. FIG. 6 is a perspective view showing a structure of a casing unit of the light conversion device in FIG. 2.

As shown in FIG. 2, phosphor wheel device 10 includes casing unit 11, phosphor wheel 13, motor 14, and pressurization fan 15.

Casing unit 11, which has a cylindrical shape (see FIG. 3), forms an enclosed space thereinside. The enclosed space accommodates phosphor wheel 13, motor 14, heat absorber 21, and the like. As shown in FIG. 5, casing unit 11 has outer cylindrical portion 11b and inner cylindrical portion 11c that are substantially-concentrically arranged. Both ends of outer cylindrical portion 11b and inner cylindrical portion 11c are communicated with each other in a direction of axis X parallel to a rotation center of phosphor wheel 13, and form a circulation path of airflow.

Furthermore, at least a portion of casing unit 11 in contact with the outside air is formed of metal. Thus, even if the inside of casing unit 11 is warmed by heat generated in a fluorescent substance portion of phosphor layer 16 of phosphor wheel 13 provided in casing unit 11, the heat can be efficiently dissipated to the outside through the above-mentioned portion of casing unit 11, which is formed of metal with high thermal conductivity. Note that, it is preferred that the above-mentioned portion of casing unit 11, which is formed of metal, functions as lid portion 11a on a phosphor wheel 13 side, for example.

As shown in FIG. 5, before entering heat absorber 21, the airflow to which the heat generated in phosphor layer 16 is transferred passes through the vicinity of lid portion 11a disposed close to phosphor layer 16 of phosphor wheel 13. Thus, even if lid portion 11a is heated by the airflow that has passed through the vicinity of phosphor layer 16 of phosphor wheel 13 and heated, the heat of lid portion 11a can be dissipated to the outside, effectively. As a result, as compared with other members (outer cylindrical portion 11b, inner cylindrical portion 11c, bottom portion 11d) that constitute casing unit 11, the heat of the airflow can be dissipated to the outside more effectively.

As shown in FIG. 3, lid portion 11a is a substantially square-plate shaped member. Further, as shown in FIG. 2, lid portion 11a is attached to casing unit 11 so as to cover a face of phosphor wheel 13 on a phosphor layer 16 side. Further, opening 11aa into which above-mentioned optical lens 23 is inserted is formed in lid portion 11a. The blue laser light and fluorescence (red, green) pass through optical lens 23.

Opening 11aa is a through hole formed to face phosphor layer 16 of phosphor wheel 13 in lid portion 11a. Optical lens 23 is attached to opening 11aa via optical lens holding component 23a.

As shown in FIGS. 3 and 6, outer cylindrical portion 11b is a substantially cylindrical shaped member that forms a side face of casing unit 11.

Inner cylindrical portion 11c is a cylindrical member that is concentrically arranged with respect to outer cylindrical portion 11b, and disposed on an inner circumferential side of outer cylindrical portion 11b. Inner cylindrical portion 11c is disposed adjacent to an inner circumferential side of heat absorber 21. Furthermore, inner cylindrical portion 11c is formed to have a dimension smaller than that of outer cylindrical portion 11b in the direction of axis X. Thus, both ends of outer cylindrical portion 11b and inner cylindrical portion 11c are communicated with each other in the direction of axis X.

As shown in FIG. 5, bottom portion lid is attached to outer cylindrical portion 11b to cover a face on an opposite side of casing unit 11 from the face on which lid portion 11a is provided in the direction of axis X.

Updraft guide 11e is a guide member for inverting and raising the airflow that has passed through heat absorber 21 and cooled. Updraft guide 11e is provided on bottom portion 11d to project toward an inner space side of casing unit 11. Updraft guide 11e has a substantially cone shape centered on axis X. Along updraft guide 11e, the airflow that has flowed into the inner circumferential side of inner cylindrical portion 11c from the outer circumferential side thereof is guided to rise up, using wind force of pressurization fan 15.

Accordingly, the airflow generated by pressurization fan 15 during rotation of phosphor wheel 13 is guided outward in the radial direction from an inner peripheral side of inner cylindrical portion 11c along a face of phosphor wheel 13 on which the phosphor layer is not provided. The airflow passes through the inside of heat absorber 21 and is cooled, while moving downward in the direction of axis X. The airflow that has passed through heat absorber 21 and cooled is returned back to the inner peripheral side of inner cylindrical portion 11c from communicating part 11h located on an opposite side to phosphor wheel 13. In this way, in the internal space of casing unit 11, a circulation path of the airflow generated by pressurization fan 15 is formed during rotation of phosphor wheel 13.

Herein, motor 14 for driving to rotate phosphor wheel 13 is disposed on a path of the airflow cooled by heat absorber 21, as shown in FIG. 5. Accordingly, even if heat is generated in motor 14 by continuous rotation of phosphor wheel 13, the cooling air can cool motor 14 effectively.

Further, pressurization fan 15 is disposed within the circulation path of the airflow formed in casing unit 11, and send air along a direction in which the airflow flows in the circulation path. Furthermore, pressurization fan 15 is disposed between phosphor wheel 13 and updraft guide 11e in casing unit 11. In other words, pressurization fan 15 is disposed on the most downstream side in the circulation path of the airflow. Therefore, the airflow can be strengthened on the most downstream side in which the airflow is most weakened. As a result, the speed of the airflow can be increased near phosphor wheel 13 or motor 14, so that a cooling effect is more improved.

Figure 7:
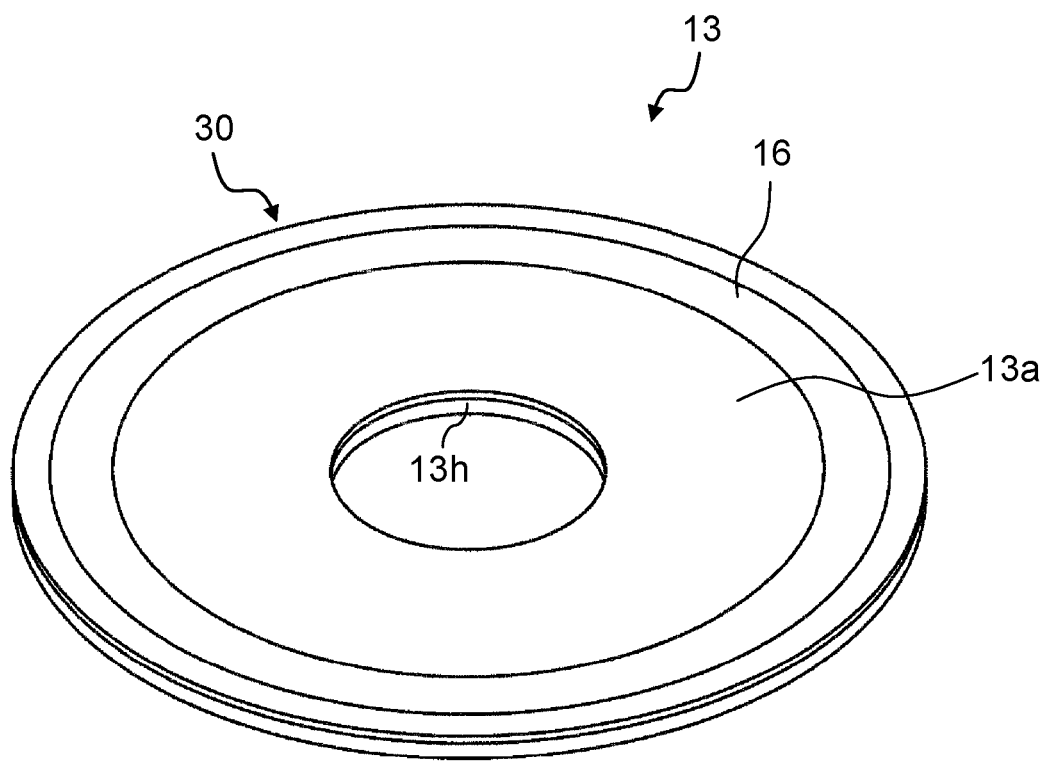
FIG. 7 is a perspective view showing a first face side of a phosphor wheel.
Figure 8:
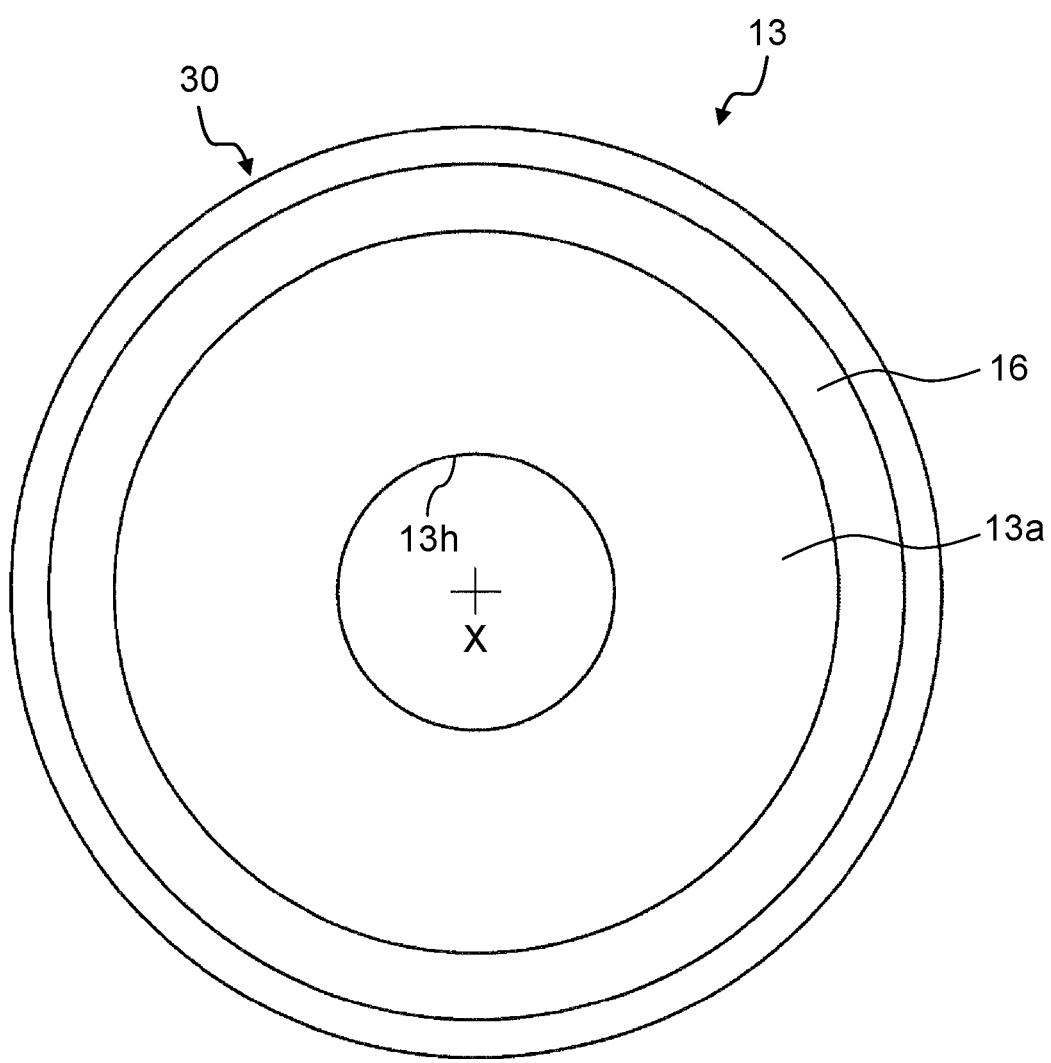
FIG. 8 is a plan view showing the first face side of a phosphor wheel.

FIG. 7 is a perspective view showing a first face side of the phosphor wheel. FIG. 8 is a plan view showing the first face side of the phosphor wheel. As shown in FIGS. 7 and 8, phosphor wheel 13 includes disk-shaped member 30 having a disk-like shape, and phosphor layer 16 disposed on first face 13a (one face) of disk-shaped member 30. In the center of disk-shaped member 30, center hole 13h is provided to fit motor 14 (see FIG. 5) thereinto. As shown in FIG. 5, phosphor wheel 13 (disk-shaped member 30) is fixed to rotation member 14a of motor 14 thermally and conductively. When phosphor wheel 13 is irradiated with the blue laser beam, temperature of phosphor wheel 13 becomes higher than that of rotation member 14a. Accordingly, the heat of phosphor wheel 13, which is elevated to high temperature, is conveyed to rotation member 14a and dissipated thereinto, so that the temperature near center hole 13h of phosphor wheel 13 becomes lower than that of the outer circumferential side. In other words, rotation member 14*a* functions as a cooling member.

Phosphor layer 16 has an annular shape centered on rotation axis X. For instance, fluorescent substance particles forming the phosphor layer 16 are applied on the first outer face 13*a* of the phosphor wheel 13 annularly to form phosphor layer 16.

Figure 9:
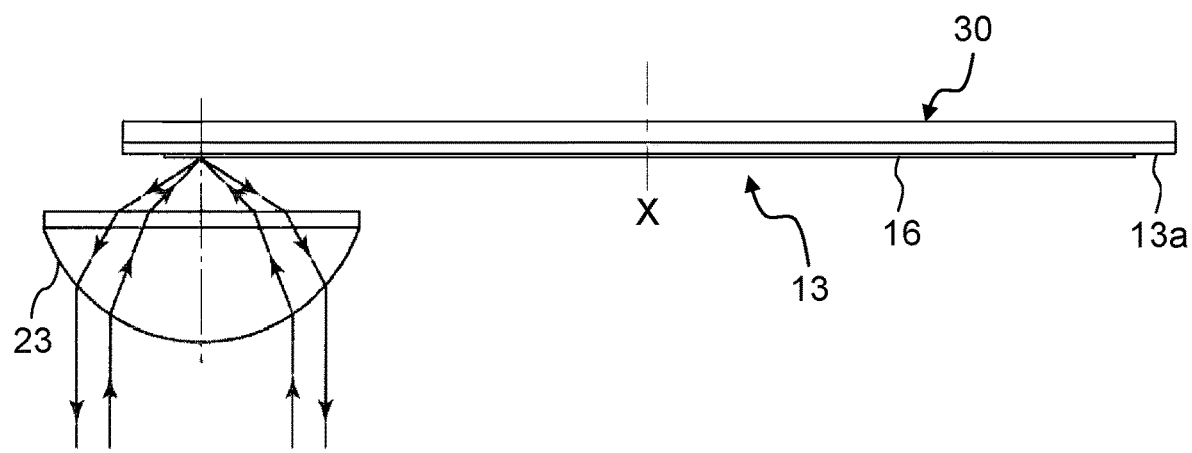
FIG. 9 is a side view of the phosphor wheel.
Figure 10:
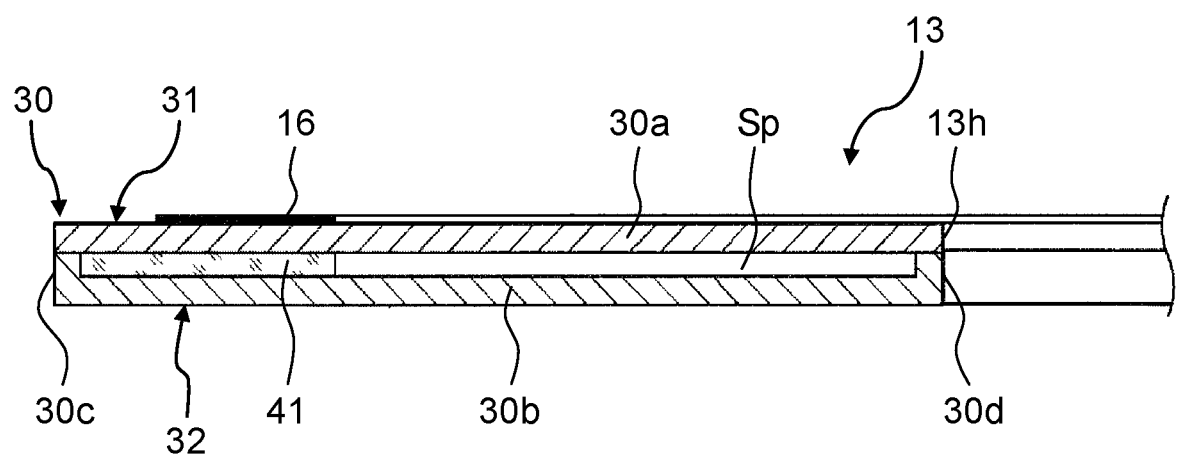
FIG. 10 is a cross-sectional view of the phosphor wheel.

FIG. 9 is a side view of the phosphor wheel. FIG. 10 is a cross-sectional view of the phosphor wheel. Note that, FIG. 10 is a view showing a cross-section of the phosphor wheel in a rotation state taken along line 10-10 in FIG. 12, described later.

Optical lens 23 is disposed to face phosphor layer 16 formed on the first face 13*a* of phosphor wheel 13. In the present exemplary embodiment, it is illustrated, by example, that the light conversion device is configured to irradiate phosphor layer 16, which is formed on the first face 13*a* of phosphor wheel 13, with the blue laser beam through optical lens 23 to perform wavelength conversion, and return the wavelength-converted light to an optical lens 23 side to use it.

Disk-shaped member 30 has first disk portion 30*a* that has first outer face 13*a* on which phosphor layer 16 is disposed, and second disk portion 30*b* that faces first disk portion 30*a* so as to be spaced apart from each other by a predetermined distance. Further, disk-shaped member 30 has cylindrical outer circumferential face portion 30*c* that connects an outer circumferential edge of first disk portion 30*a* and an outer circumferential edge of second disk portion 30*b*. Furthermore, disk-shaped member 30 has inner circumferential face portion 30*d* that connects an inner circumferential edge of first disk portion 30*a* and an inner circumferential edge of second disk portion 30*b*. In this way, by using first disk portion 30*a*, second disk portion 30*b*, outer circumferential face portion 30*c*, and inner circumferential face portion 30*d*, annular enclosed space Sp centered on rotation axis X is formed inside disk-shaped member 30. In other words, disk-shaped member 30 has a hollow-box structure that forms enclosed space Sp.

Figure 11:
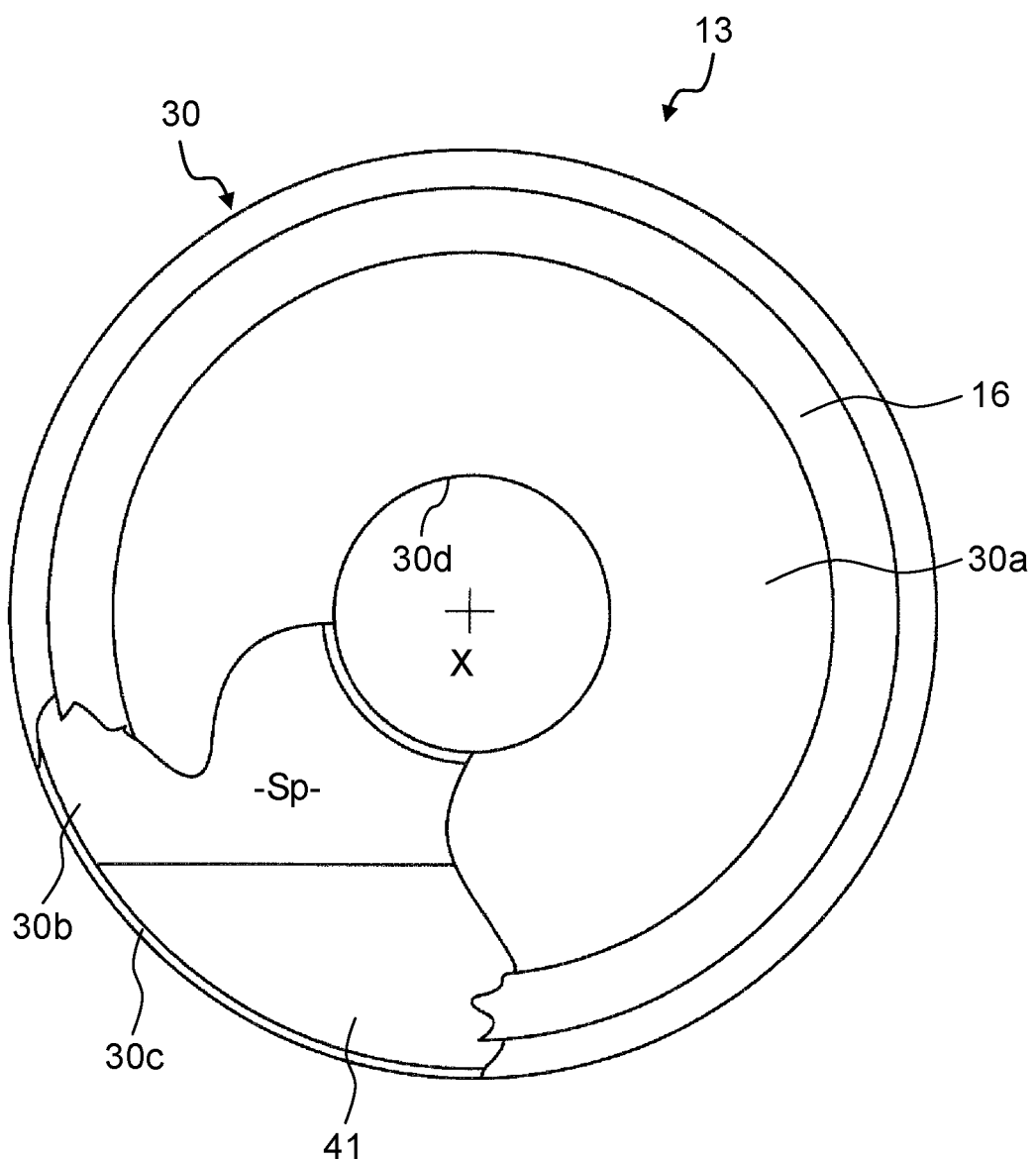
FIG. 11 is a partially broken plan view showing the first face side of the phosphor wheel.

FIG. 11 is a partially broken plan view showing a first face side of the phosphor wheel. Air and coolant 41 are hermetically sealed into enclosed space Sp. Coolant 41 is, for example, water. Coolant 41 may be, for example, a chlorofluorocarbon alternative. An amount of coolant 41 and an air pressure of enclosed space Sp are determined such that coolant 41 evaporates to a gas state from a liquid state at more than or equal to predetermined temperature in enclosed space Sp. Enclosed space has a pressure ranging from 0.5 atm to 2.0 atm (from 500 hPa to 2000 hPa). The predetermined temperature may be, for example, a temperature at which wavelength conversion efficiency of the fluorescent substance, which forms phosphor layer 16, begins to decrease along a steeper gradient than specified. Further, the predetermined temperature is higher than temperature of the coolant before a fluorescent substance is excited by the laser beam, and lower than temperature of the coolant after the fluorescent substance has been excited by the laser beam. The predetermined temperature is in the range from 70° C. to 160° C., for example.

FIG. 11 shows a state of coolant 41 when phosphor wheel 13 is disposed such that rotation axis X is directed in a horizontal direction. When phosphor wheel 13 is not rotated, coolant 41 remains accumulated in a lower portion of enclosed space Sp. Note that, the phosphor wheel of the present disclosure may be disposed such that its rotation axis is directed in a vertical direction, or obliquely with respect to the vertical direction.

In the present exemplary embodiment, first disk portion 30*a* of disk-shaped member 30 is constituted by first disk member 31. Further, second disk portion 30*b*, outer circumferential face portion 30*c*, and inner circumferential face portion 30*d* are constituted by second disk member 32. First disk member 31 and second disk member 32 are formed of copper. First disk member 31 and second disk member 32 may be formed of the other metals such as aluminum, rather than copper. As an example, first disk member 31 and second disk member 32 are bonded by diffusion bonding. Specifically, first disk member 31 and second disk member 32 are heated at predetermined temperature for predetermined time in the state where being arranged in a predetermined positional relationship. Addition to this, first disk member 31 and second disk member 32 are sandwiched at predetermined pressure, and bonded. In at least one of first disk portion 30*a* or second disk portion 30*b*, an insertion hole (not shown) for inserting coolant 41 into enclosed space Sp is provided in advance. A predetermined amount of coolant 41 is inserted into enclosed space Sp, and inside pressure of enclosed space Sp is adjusted to have a predetermined air pressure. After that, the insertion hole is sealed by caulking or metal brazing.

2. Operation

Figure 12:
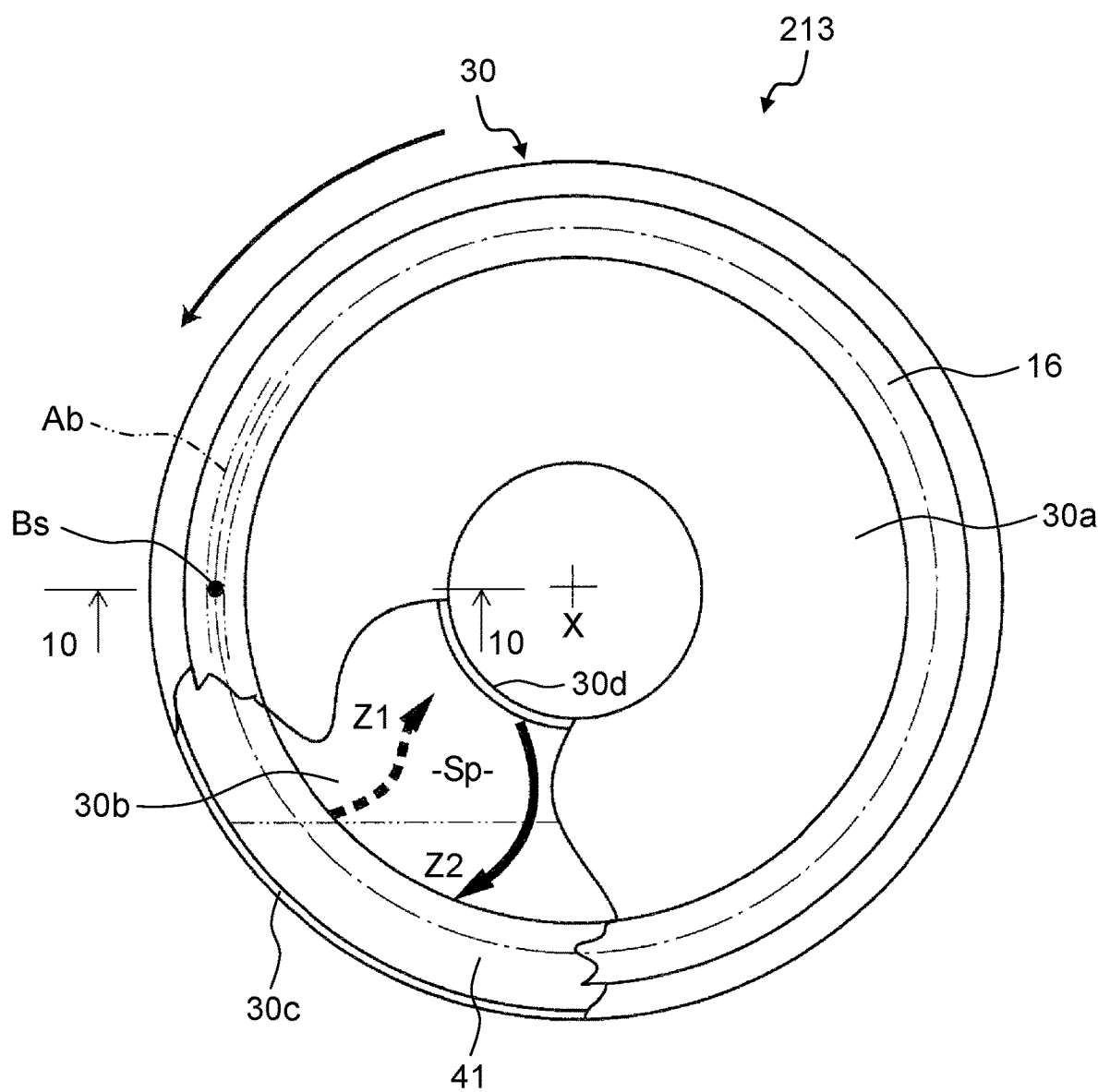
FIG. 12 is a partially broken plan view showing the first face side of the phosphor wheel in a rotation state.

FIG. 12 is a partially broken plan view showing a first face side of the phosphor wheel in a rotation state. When phosphor wheel 13 (disk-shaped member 30) is in rotation about rotation axis X, coolant 41 in a liquid state is distributed annularly toward an outer circumferential side of enclosed space Sp due to a centrifugal force caused by the rotation. At this time, a volume of coolant 41 is determined such that, as shown also in FIG. 10, the entire area of annular phosphor layer 16 on the outer surface of the phosphor wheel 30 is overlapped with the distribution area of coolant 41 in the liquid state within the phosphor wheel 30, which is distributed annularly, when viewed along the direction of rotation axis X. When phosphor layer 16 is irradiated with the blue laser beam, phosphor layer 16 generates heat. The heat is conveyed to coolant 41 through first disk portion 30*a*. When the temperature of coolant 41 is increased to more than or equal to predetermined temperature, coolant 41 evaporates. At this time, first disk portion 30*a* and phosphor layer 16 are cooled by evaporation latent heat. As indicated by arrow Z1, the vaporized coolant travels in enclosed space Sp toward its inner circumferential side. As mentioned above, an inner circumferential side of disk-shaped member 30, which is connected to rotation member 14*a* of motor 14, has a temperature lower than that of an outer circumferential side of disk-shaped member 30. Therefore, the vapor of the coolant that reaches the inner circumferential side of enclosed space Sp is cooled and liquefied. As indicated by arrow Z2, liquefied coolant 41 travels in enclosed space Sp toward its outer circumferential side due to centrifugal force. A cycle of the evaporation and the liquefaction is performed continuously, so that phosphor layer 16 is cooled continuously.

According to the present exemplary embodiment, a cooling effect of phosphor layer 16 is improved. Therefore, a period of time to irradiate phosphor layer 16 with the blue laser beam can be made longer than before. This makes it possible to achieve downsizing of motor 14 and reduce a noise and vibration, while enabling reduction in rotation speed of phosphor wheel 13. Further, phosphor wheel 13, itself, can be miniaturized because the cooling effect of phosphor layer 16 is improved.

Furthermore, a liquid type of coolant 41 is sealed into disk-shaped member 30. Thus, centrifugal force acts on coolant 41 during the rotation, so that coolant 41 is pushed against the outer circumferential side of enclosed space Sp of disk-shaped member 30. Accordingly, a rotational balance of phosphor wheel 13 is autonomously adjusted. This makes it possible to reduce a rotational balance adjustment work of phosphor wheel 13 when light conversion device 20 is manufactured or the like.

Still further, it is not necessary to provide such fine channels as described in JP Publication No. 2017-27685 or the like in phosphor layer 16, thereby avoiding from deterioration in density of fluorescent substance particles, unlike JP Publication No. 2017-27685. Accordingly, phosphor layer 16 can obtain wavelength conversion efficiency higher than that of JP Publication No. 2017-27685. Consequently, the present exemplary embodiment can provide phosphor wheel 13 of which cooling performance is improved without adversely affecting its conversion efficiency.

Note that, in the case where the blue laser beam is emitted on only a partial area, rather than over the entire width in the radial direction of phosphor layer 16, the volume of coolant 41 may be determined such that irradiation area Ab (area having a diameter width of laser beam convergent point Bs) of phosphor layer 16, which is irradiated with the blue laser beam, is overlapped with the distribution area of coolant 41 in the liquid state, which is annularly distributed, when viewed along a direction of rotation axis X. This makes it possible to decrease the enclosed amount of coolant 41 and reduce inertia at the beginning of rotation. Therefore, a load of motor 14 can be made smaller and motor 14 can be miniaturized more.

3. Effect

Phosphor wheel 13 of the present exemplary embodiment includes disk-shaped member 30 rotated about rotation axis X, and phosphor layer 16 disposed on first outer face 13a (one face) of disk-shaped member 30. Disk-shaped member 30 has a hollow-box structure that forms enclosed space Sp. Coolant 41 is sealed into enclosed space Sp, while the phosphor layer is outside the enclosed space Sp. Coolant 41 evaporates to a gas state from a liquid state at more than or equal to predetermined temperature. In the liquid state, coolant 41 has a volume smaller than a capacity of enclosed space Sp.

This makes it possible to provide phosphor wheel 13 of which cooling performance is improved without affecting the conversion efficiency, and light conversion device 20 including the same.

Further, in phosphor wheel 13 of the present exemplary embodiment, phosphor layer 16 has an annular shape centered on rotation axis X. Enclosed space Sp is an annular space centered on rotation axis X. When disk-shaped member 30 is rotated about rotation axis X and coolant 41 in the liquid state is distributed annularly in enclosed space Sp toward its outer circumferential side due to centrifugal force caused by the rotation, the volume of coolant 41 is determined such that the entire area of phosphor layer 16 is overlapped with the distribution area of coolant 41 in the liquid state, which is distributed annularly, when viewed along the direction of rotation-axis X.

This makes it possible to cool the entire area (full width) in the radial direction of phosphor layer 16 appropriately.

Note that, when disk-shaped member 30 is rotated about rotation axis X and coolant 41 in the liquid state is distributed annularly in enclosed space Sp toward its outer circumferential side due to centrifugal force caused by the rotation, the volume of coolant 41 may be determined such that at least irradiation area Ab of phosphor layers 16, which is irradiated with the blue laser beam, is overlapped with the distribution area of coolant 41 in the liquid state, which is distributed annularly, when viewed along the direction of rotation-axis X. This makes it possible to cool at least irradiation area of phosphor layer 16, which is irradiated with the blue laser beam, appropriately.

Further, the present exemplary embodiment provides light conversion device 20 including phosphor wheel 13 of the present exemplary embodiment, and blue LDs 2a and 2b (light source) that emit light beams for exciting a fluorescent substance of phosphor layer 16 of phosphor wheel 13.

In the above description, the first exemplary embodiment of the phosphor wheel in the present disclosure has been described. In the following, second to seventh exemplary embodiments will be described as variations of the phosphor wheel in the present disclosure. Note that, in descriptions of the second to seventh exemplary embodiments, the same reference numerals are assigned to components having the same or a similar function.

Second Exemplary Embodiment

A second exemplary embodiment will be described. The second exemplary embodiment will be described focusing on a difference from the first exemplary embodiment.

Figure 13:
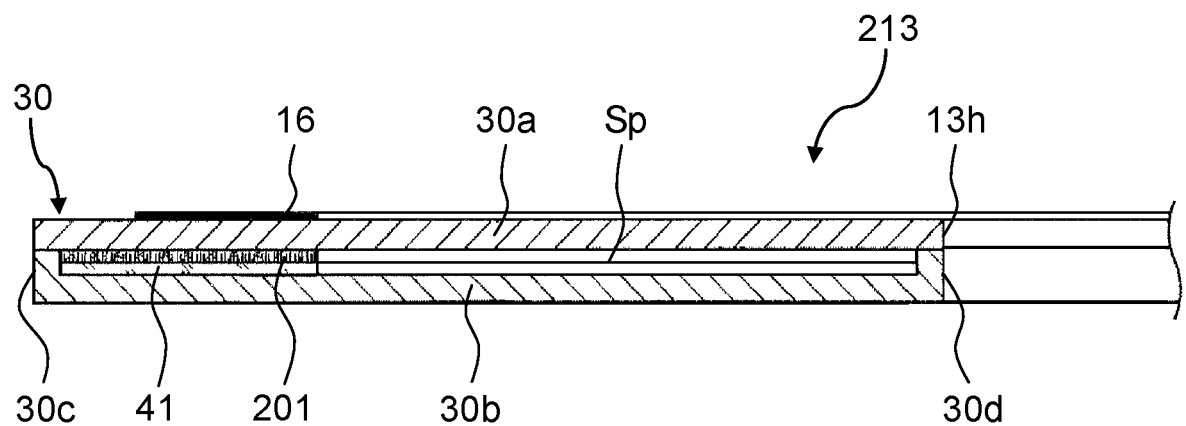
FIG. 13 is a cross-sectional view of a phosphor wheel in a second exemplary embodiment.
Figure 14:
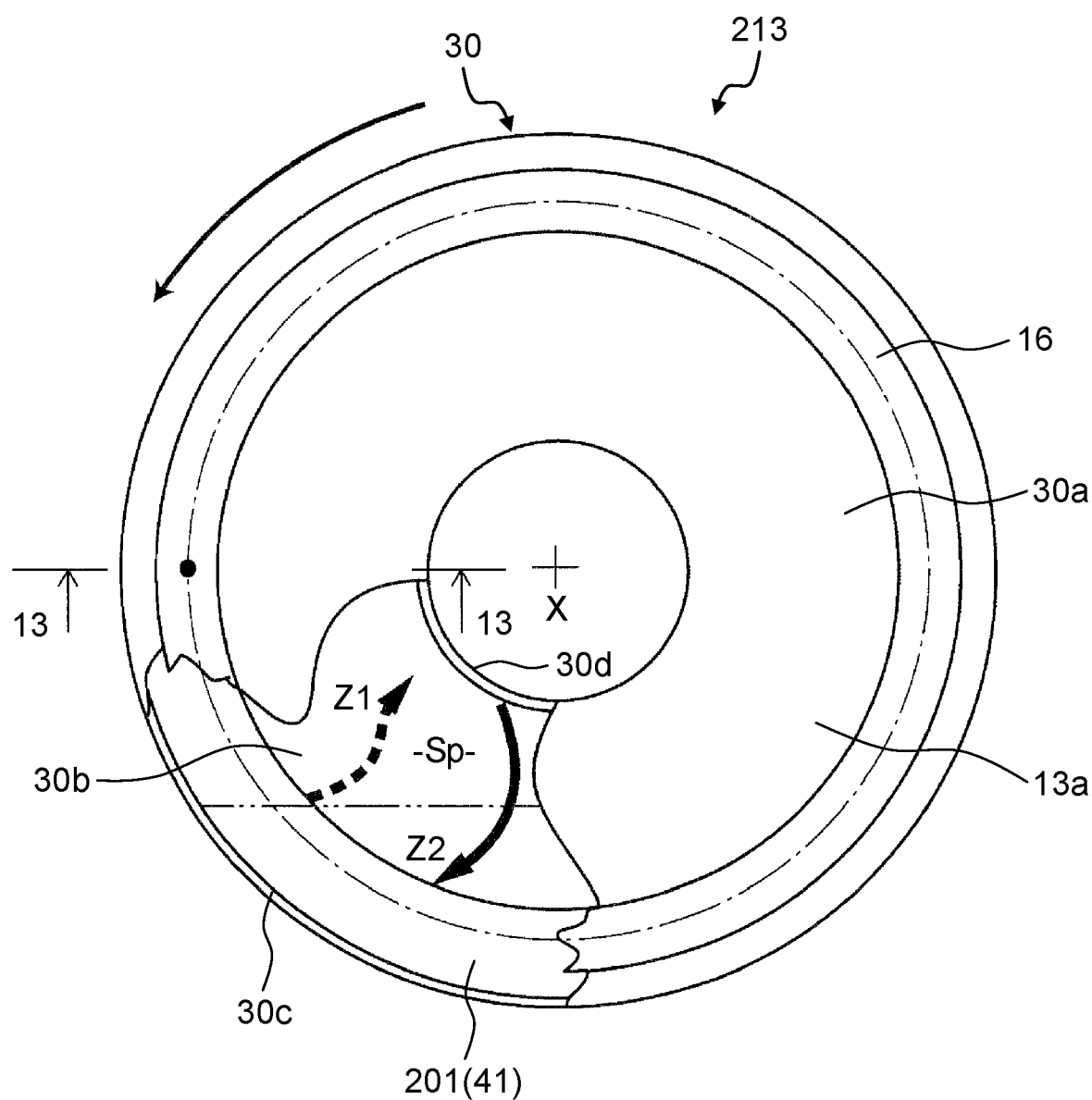
FIG. 14 is a partially broken plan view showing a first face side of the phosphor wheel of the second exemplary embodiment in a rotation state.

FIG. 13 is a cross-sectional view of a phosphor wheel in the second exemplary embodiment. FIG. 13 is a view showing a cross-section of phosphor wheel 213 in a rotation state taken along line 13 to 13 in FIG. 14. FIG. 14 is a partially broken plan view showing a first face side of the phosphor wheel in the rotation state.

In phosphor wheel 213 of the second exemplary embodiment, annular porous body 201 is disposed in an area at which phosphor layer 16 is projected onto enclosed space Sp in a direction of rotation-axis X, although the structure of disk-shaped member 30 is the same as in the first exemplary embodiment. Porous body 201 is formed of a sintered metal that is formed by sintering, for example, copper, silver, or the like, and has a lot of micro-pores thereinside. The micro-pores are connected to one another randomly, and form a passage of gas or liquid.

While adhering to first disk portion 30a, porous body 201 is disposed to face second disk portion 30b apart from each other by a gap.

When disk-shaped member 30 is in rotation about rotation axis X, coolant 41 in a liquid state enters between second disk portion 30b and porous body 201, due to centrifugal force caused by the rotation, on the outer circumferential side of enclosed space Sp, and is distributed annularly. Coolant 41 in the liquid state, which has entered, is adsorbed to the micro-pores in porous body 201, so that coolant 41 comes into contact with first disk portion 30a. A volume of coolant 41 is determined such that the entire area of annular phosphor layer 16 is overlapped with a distribution area of coolant 41 in the liquid state, which is distributed annularly, and an area of annular porous body 201.

When disk-shaped member 30 is in rotation about rotation axis X, coolant 41 in the liquid state enters between second disk portion 30b and porous body 201, due to centrifugal force caused by the rotation, on the outer circumferential side of enclosed space Sp. Further, coolant 41 in the liquid state, which has entered, is adsorbed to the micro-pores in porous body 201, so that coolant 41 comes into contact with first disk portion 30a. When phosphor layer 16 is irradiated with the blue laser beam, phosphor layer 16 generates heat. The heat is conveyed to coolant 41 in porous body 201 through first disk portion 30a. When temperature of coolant 41 is increased to more than or equal to the predetermined temperature, coolant 41 evaporates. At this time, the first disk portion 30a and phosphor layer 16 are cooled by evaporation latent heat. In that case, in the present exemplary embodiment, coolant 41 in the liquid state is held by the micro-pores of porous body 201, thereby making it easy to raise the temperature of coolant 41, which has been held, and evaporate coolant 41. In other words, the evaporation efficiency is improved. Therefore, porous body 201 and phosphor layer 16 are further cooled by evaporation latent heat.

The vaporized coolant moves to an inner circumferential side of porous body 201 through the micro-pores in porous body 201 and is detached from porous body 201. Furthermore, the vaporized coolant travels in enclosed space Sp toward its inner circumferential side, as indicated by arrow Z1. As mentioned above, an inner circumferential side of disk-shaped member 30 is connected to rotation member 14a of motor 14, and its temperature is lower than that of an outer circumferential side of disk-shaped member 30. Therefore, the vapor of the coolant, which has moved to the inner circumferential side of enclosed space Sp, is cooled and liquefied. Liquefied coolant 41 travels in enclosed space Sp toward its outer circumferential side due to centrifugal force, as indicated by arrow Z2. A cycle of the evaporation and the liquefaction is performed continuously, so that phosphor layer 16 is cooled continuously.

According to phosphor wheel 213 with the above-mentioned structure, an enclosed amount of coolant 41 can be reduced by a volume of porous body 201 that is provided. Thus, the inertia at the beginning of rotation is reduced. This makes it possible to reduce a load of motor 14, so that motor 14 can be miniaturized more. Further, since a gap is provided between porous body 201 and second disk portion 30b, coolant 41 in the liquid state can easily reach the outer circumferential edge of disk-shaped member 30. If the gap is not provided, coolant 41 in the liquid state will be forced to permeate into porous body 201 only from its inner circumferential end. This makes it difficult for coolant 41 in the liquid state to reach the outer circumference of disk-shaped member 30, thereby causing such a problem that the outer circumferential side of phosphor layer 16 is hard to be cooled.

On the other hand, in phosphor wheel 213 of the second exemplary embodiment, phosphor layer 16 has an annular shape centered on rotation axis X. Enclosed space Sp is provided annularly about rotation axis X. Porous body 201 is disposed in an area at which phosphor layer 16 is projected onto enclosed space Sp in the direction of rotation axis X. Thus, phosphor layer 16 can be cooled appropriately, and an amount of coolant 41 sealed into enclosed space Sp can be reduced simultaneously.

Further, in phosphor wheel 213 of the second exemplary embodiment, disk-shaped member 30 has first disk portion 30a that has first face 13a, and second disk portion 30b that faces first disk portion 30a via enclosed space Sp. Porous body 201 adheres to first disk portion 30a, and faces the second disk portion 30b via a gap. Thus, the present exemplary embodiment can cool the outer circumferential side of phosphor layer 16 sufficiently, while disposing porous body 201.

Third Exemplary Embodiment

A third exemplary embodiment will be described. The third exemplary embodiment will be described focusing on a difference from the first exemplary embodiment.

Figure 15:
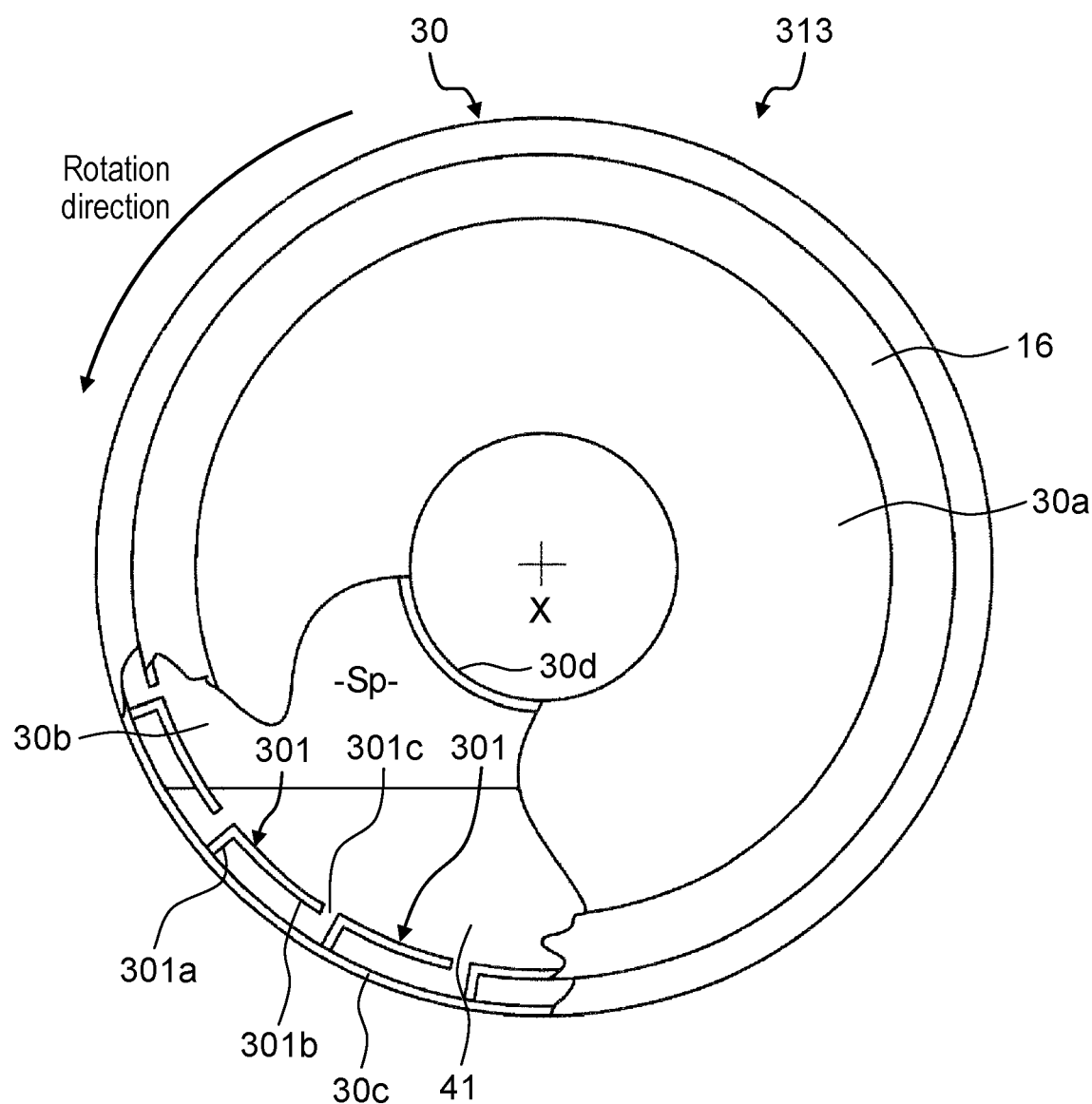
FIG. 15 is a partially broken plan view showing a first face side of a phosphor wheel of a third exemplary embodiment in a rotation state.

FIG. 15 is a partially broken plan view showing a first face side of a phosphor wheel in the third exemplary embodiment. FIG. 15 is a view showing the phosphor wheel in a rotation-stop state.

In phosphor wheel 313 of the third exemplary embodiment, two or more ladle-shaped portions 301 are disposed in an outer circumferential portion of enclosed space Sp. Ladle-shaped portions 301 are disposed at regular intervals in a circumferential direction, and coolant 41 in a liquid state flows into ladle-shaped portions 301 during rotation of disk-shaped member 30, and coolant 41 that has flowed into ladle-shaped portions 301 is accumulated therein. Specifically, each of ladle-shaped portions 301 has first wall portion 301a that extends from outer circumferential face portion 30c of disk-shaped member 30 toward an inner circumferential side in a radial direction of enclosed space Sp, and second wall portion 301b that extends from an inner circumferential end of first wall portion 301a toward a rotation direction (circumferential direction indicated by the arrow in FIG. 15) of phosphor wheel 313. An end on a first disk portion 30a side of first wall portion 301a and an end on a first disk portion 30a side of second wall portion 301b are connected to first disk portion 30a. Further, an end on a second disk portion 30b side of first wall portion 301a and an end on a second disk portion 30b side of second wall portion 301b are connected to second disk portion 30b. Furthermore, a tip end of second wall portion 301b and an inner circumferential edge of first wall portion 301a of adjacent (next) ladle-shaped portion 301 are not connected, so that opening 301c is formed. Thus, ladle-shaped portion 301 forms a bag-like space whose entrance corresponds to opening 301c. Opening 301c functions as an entrance from which coolant 41 flows into the bag-like space.

As shown in FIG. 15, in the rotation-stop state, coolant 41 in the liquid state is accumulated in a lower side portion of enclosed space Sp. At this time, coolant 41 in the liquid state is accumulated in some of ladle-shaped portions 301. Note that, as mentioned above, FIG. 15 is illustrated based on the assumption that phosphor wheel 313 is disposed such that the rotation axis is directed in the horizontal direction.

Next, an effect of the present exemplary embodiment will be described. For comparison, phosphor wheel 13 of the first exemplary embodiment in which ladle-shaped portions 301 are not provided will be described first.

Figure 16:
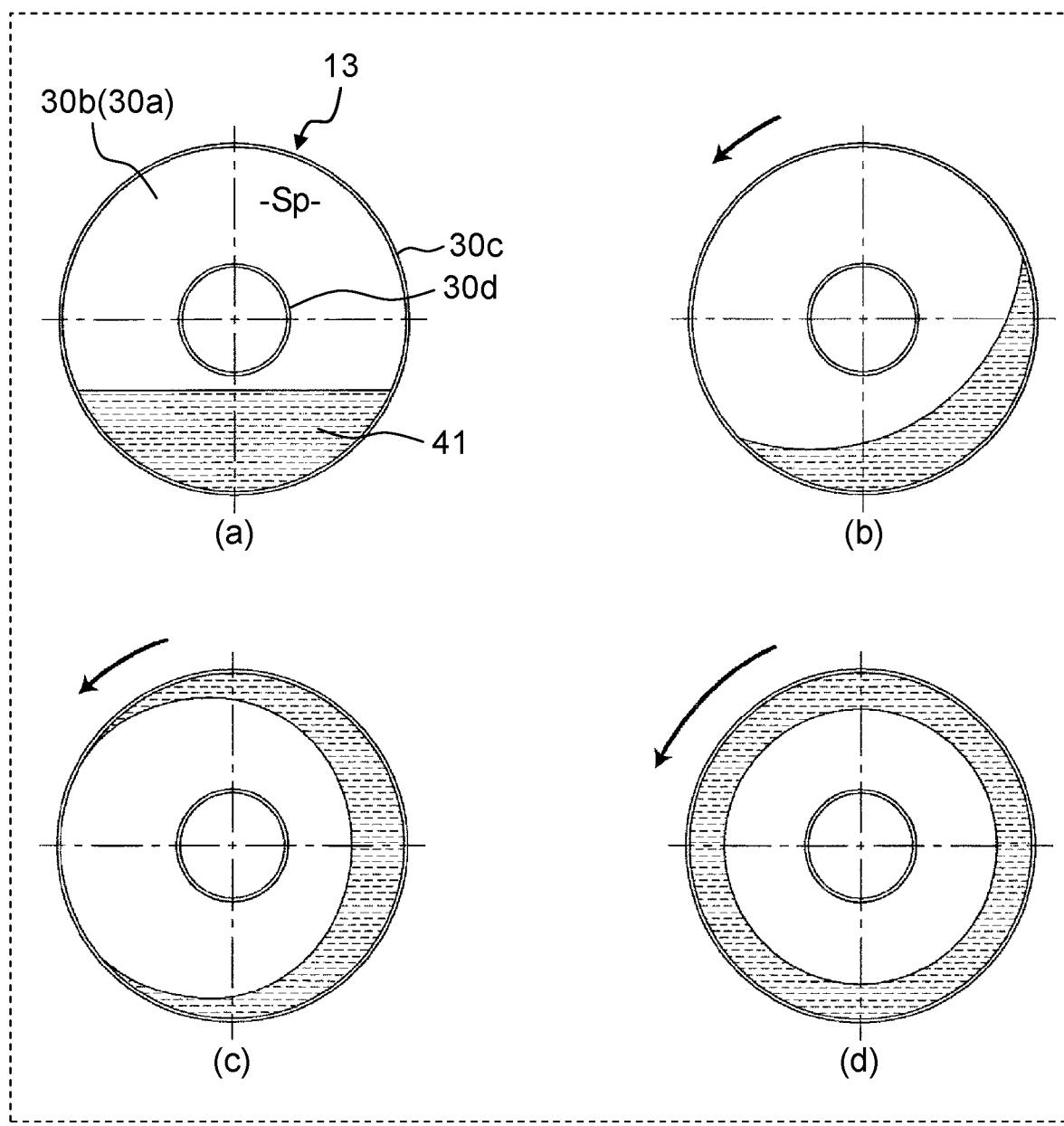
FIG. 16 is a view describing a distribution of a coolant during a process in which the phosphor wheel in the first exemplary embodiment is changed from a stationary state to steady rotation.

FIG. 16 is a view describing a distribution of the coolant during rotation of the phosphor wheel in the first exemplary embodiment. In (a) of FIG. 16, there is shown a state when rotation of phosphor wheel 13 is stopped. In (b) and (c) of FIG. 16, there are shown states when phosphor wheel 13 is being accelerated after the rotation is started. In (d) of FIG. 16, there is shown a state when phosphor wheel 13 is in steady rotation. Note that, the arrows in (c) through (d) of FIG. 16, which indicate the rotation direction, each are expressed by length corresponding to the rotational speed.

The rotation of phosphor wheel 13 is started from the state in (a) of FIG. 16. As the rotational speed rises, coolant 41 in the liquid state is dispersed in enclosed space Sp toward an outer circumferential face portion 30c side of phosphor wheel 13 due to centrifugal force, as shown in (b) and (c) of FIG. 16. When phosphor wheel 13 is in steady rotation, as shown in (d) of a FIG. 16, coolant 41 in the liquid state is dispersed over an outer circumferential side of enclosed space Sp and distributed almost uniformly. In that case, when the rotation of phosphor wheel 13 is started, coolant 41 is accumulated in enclosed space Sp. Coolant 41, mentioned above, slides along inner surfaces of first disk portion 30a, second disk portion 30b, outer circumferential face portion 30c, and inner circumferential face portion 30d, which form enclosed space Sp of phosphor wheel 13. Thus, coolant 41 accumulated in enclosed space Sp is gradually changed into the state in (d) of FIG. 16.

Figure 17:
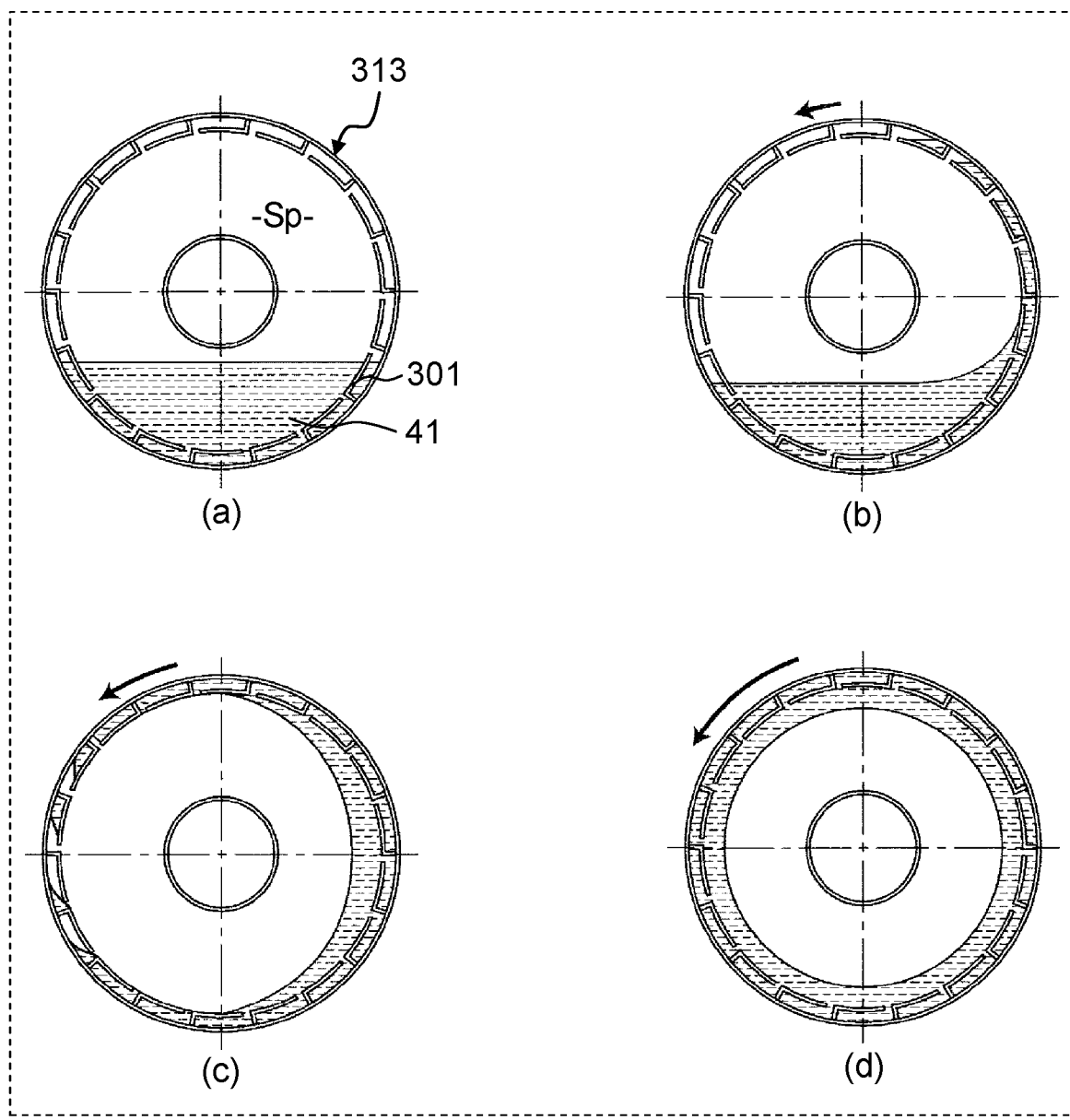
FIG. 17 is a view describing a distribution of a coolant during a process in which the phosphor wheel in the third exemplary embodiment is changed from a stationary state to steady rotation.

FIG. 17 is a view describing a distribution of coolant 41 during rotation of the phosphor wheel in the third exemplary embodiment. In (a) through (d) of FIG. 17, there are shown states from when rotation of phosphor wheel 13 is started to when phosphor wheel 313 is in steady rotation, like the description of FIG. 16. In the present exemplary embodiment, when the rotation of phosphor wheel 313 is slowly started from the rotation-stop state in (a) of FIG. 17, coolant 41 in the liquid state is captured by ladle-shaped portions 301, as shown in (b) and (c) of FIG. 17. Accordingly, as compared with phosphor wheel 13 of the first exemplary embodiment 1 in which ladle-shaped portions 301 are not provided, the present exemplary embodiment can easily be shifted to the state shown in (d) of FIG. 17, i.e., the state where coolant 41 in the liquid state is dispersed over the outer circumferential side of enclosed space Sp and distributed almost uniformly, at earlier timing (at lower rotational speed). Thus, phosphor layer 16 can be cooled appropriately at earlier timing. Furthermore, the rotation can be stabilized quickly.

As described above, in phosphor wheel 313 of the third exemplary embodiment, ladle-shaped portions 301 are provided in the outer circumferential portion of enclosed space Sp. Herein, coolant 41 in the liquid state flows into ladle-shaped portion 301 during rotation of disk-shaped member 30, and is accumulated in each of ladle-shaped portions 301. Thus, phosphor layer 16 can be cooled appropriately at earlier timing. Therefore, the effect of the first exemplary embodiment can be more improved.

Figure 18:
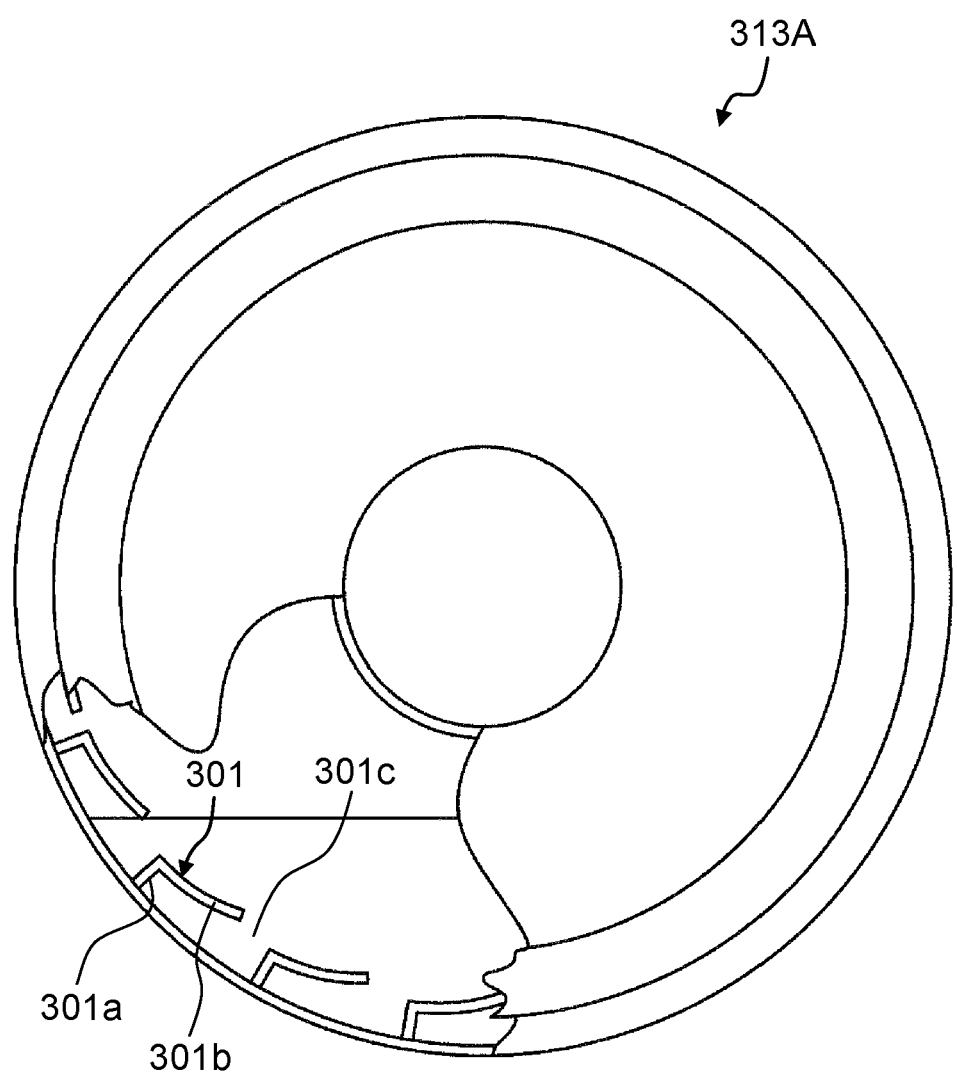
FIG. 18 is a view describing a modification of the phosphor wheel in the third exemplary embodiment.

FIG. 18 is a view describing a modification of the phosphor wheel in the third exemplary embodiment. In the modification, phosphor wheel 313A makes it easy for coolant 41 in the liquid state to flow into each of ladle-shaped portions 301. In other words, second wall portion 301b is inclined with respect to the circumferential direction such that a tip end side of second wall portion 301b is located closer to the inner circumferential side than a base end side thereof is. This makes it easier for coolant 41 in the liquid state to flow into ladle-shaped portions 301 during the rotation. Addition to this, this makes it faster to sift to the state where coolant 41 in the liquid state is dispersed over the outer circumferential side of enclosed space Sp and distributed almost uniformly.

Fourth Exemplary Embodiment

A fourth exemplary embodiment will be described with reference to FIG. 19. The fourth exemplary embodiment will be described focusing on a difference from the first exemplary embodiment.

Figure 19:
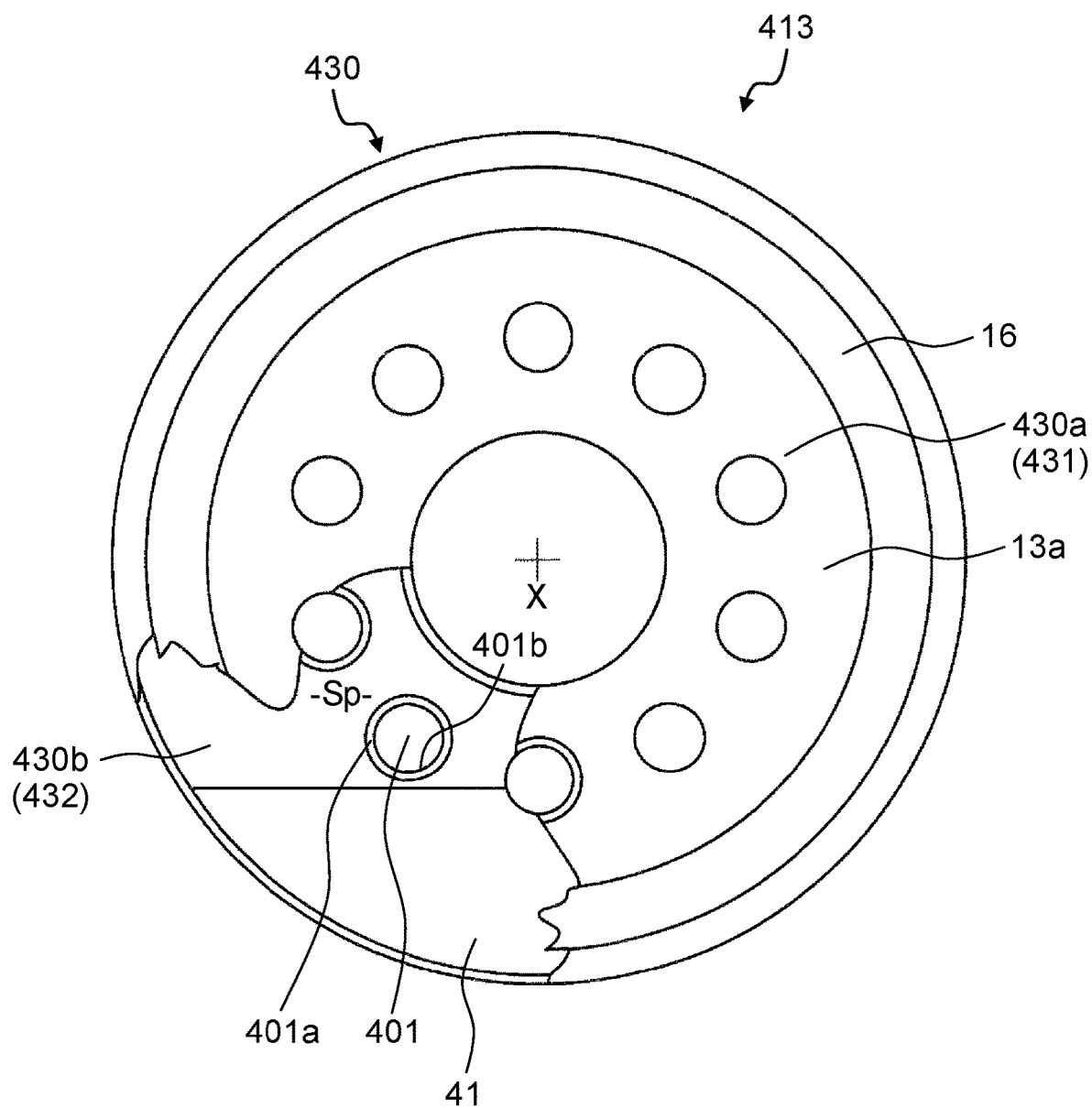
FIG. 19 is a partially broken plan view showing a first face side of a phosphor wheel in a fourth exemplary embodiment.

FIG. 19 is a partially broken plan view showing a first face side of a phosphor wheel in the fourth exemplary embodiment.

In phosphor wheel 413 of the fourth exemplary embodiment, airflow opening 401 is formed through disk-shaped member 430 in parallel with the direction of rotation-axis X, while keeping sealing performance of enclosed space Sp. Specifically, airflow opening 401 has openings 401a each being formed in a corresponding one of first disk portion 430a and second disk portion 430b to face each other, and tubular portion 401b that connects edges of openings 401a. Tubular portion 401b is integrally formed with one of first disk member 431 and second disk member, for example.

According to such a structure, during rotation of phosphor wheel 413, air can circulate between a first face 13a side of phosphor wheel 413 and a second face 13b side opposite to the first face 13a side. This makes it easier to cool phosphor wheel 413 around airflow opening 401.

Figure 20:
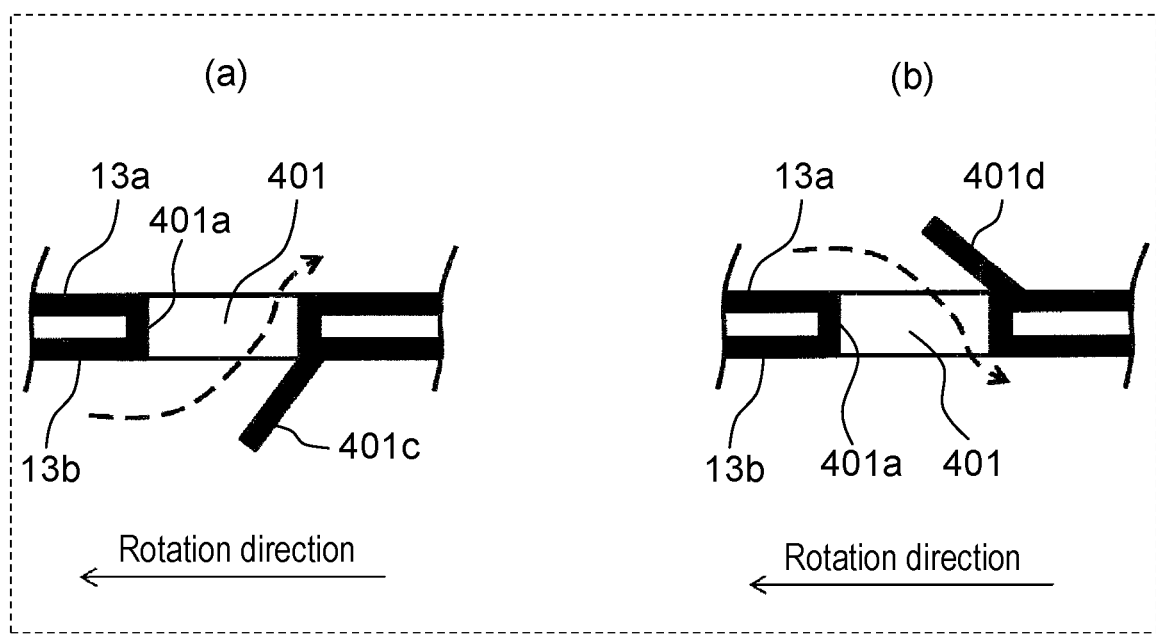
FIG. 20 is a cross-sectional view showing a schematically enlarged airflow opening of the phosphor wheel in a modification of the fourth exemplary embodiment.

FIG. 20 is a cross-sectional view showing a schematically enlarged airflow opening of the phosphor wheel in a modification of the fourth exemplary embodiment. In the vicinity of airflow opening 401, protrusion 401c, such as a blade, may be formed to project from at least one of first face 13a of first disk portion 430a and second face 13b of second disk portion 430b. Herein, protrusion 401c forces the air to circulate though opening 401a of airflow opening 401 during the rotation. In (a) of FIG. 20, there is shown an example in which protrusion 401c is formed to project from second face 13b. In (b) of FIG. 20, there is shown an example in which protrusion 401d is formed to project from first face 13a. By providing such protrusions 401c and 401d, phosphor wheel 413 can be cooled more effectively.

As described above, phosphor wheel 413 of the fourth exemplary embodiment includes airflow opening 401 passing through disk-shaped member 30 in parallel with the direction of rotation-axis X, while keeping sealing performance of enclosed space Sp, in disk-shaped member 30.

Thus, phosphor wheel 413 can be cooled more appropriately, and the effect of the first exemplary embodiment can be more improved.

Fifth to Seventh Exemplary Embodiments

In first to fourth exemplary embodiments, phosphor wheels 13, 213, 313, and 413 each of which has annular phosphor layer 16 provided on first face 13a of first disk portion 30a has been described. In a phosphor wheel of the present disclosure, however, phosphor layer 16 with an arc shape (flabellate shape), rather than an annular shape, may be provided on one face (first face) of a first disk portion. Further, a disk-shaped member may be formed of materials other than metal. Hereinafter, in fifth to seventh exemplary embodiments, an example thereof will be described.

Fifth Exemplary Embodiment

A fifth exemplary embodiment will be described. The fifth exemplary embodiment will be described focusing on a difference from the first exemplary embodiment.

Figure 21:
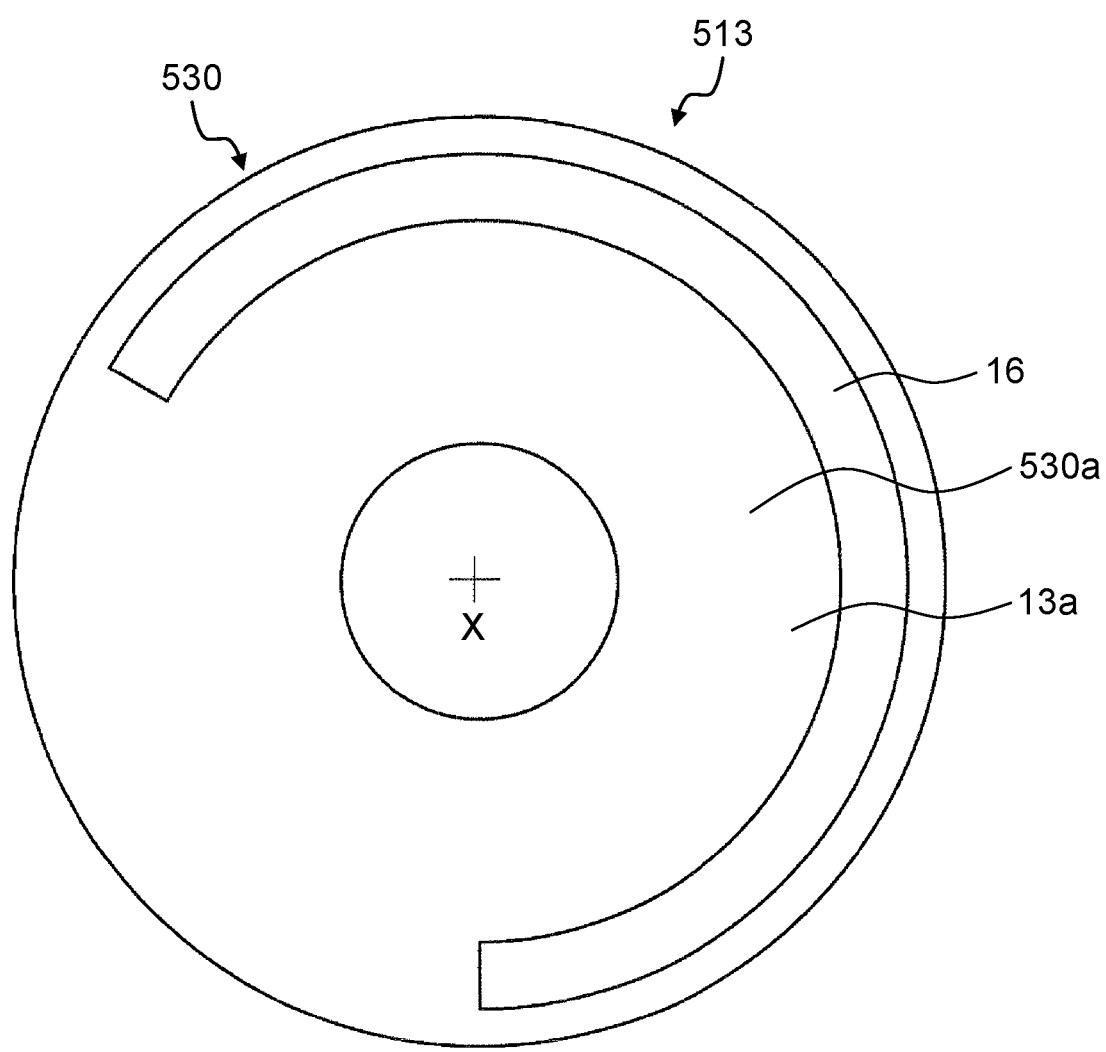
FIG. 21 is a plan view showing a first face side of a phosphor wheel in a fifth exemplary embodiment.

FIG. 21 is a plan view showing a first face side of phosphor wheel 513 in the fifth exemplary embodiment.

In the fifth exemplary embodiment, first disk portion 530a of phosphor wheel 513 is formed of metal such as copper, like the first exemplary embodiment, but the entire face of first face 13a of first disk portion 530a is mirror surface-finished, and first face 13a is configured to reflect light as a mirror face. Further, phosphor layer 16 with an arc shape (flabellate shape) centered on rotation axis X is provided on first face 13a of first disk portion 530a.

In phosphor wheel 513 of the present exemplary embodiment, among the conversion light beams obtained by wavelength conversion of the blue laser beam, a light beam that has passed through phosphor layer 16 is also reflected on first face 13a of first disk portion 530a, so that the light beam can be returned to the optical lens 23 side, as shown in FIG. 9, mentioned above. On the other hand, a blue laser beam emitted on the mirror face, i.e., an area in which phosphor layer 16 is not provided on first face 13a of first disk portion 530a, is returned to the optical lens 23 side without being subjected to the wavelength conversion.

Note that, if the same structure as in one of the first to third exemplary embodiments is employed as an inside structure of disk-shaped member 530 of phosphor wheel 513, the same effect as in the first to third exemplary embodiments will be obtained. Further, an airflow opening like the fourth exemplary embodiment may be provided in disk-shaped member 530. By providing the airflow opening, the same effect as in the fourth exemplary embodiment is obtained.

Sixth Exemplary Embodiment

A sixth exemplary embodiment will be described. The sixth exemplary embodiment will be described focusing on a difference from the first exemplary embodiment.

Figure 22:
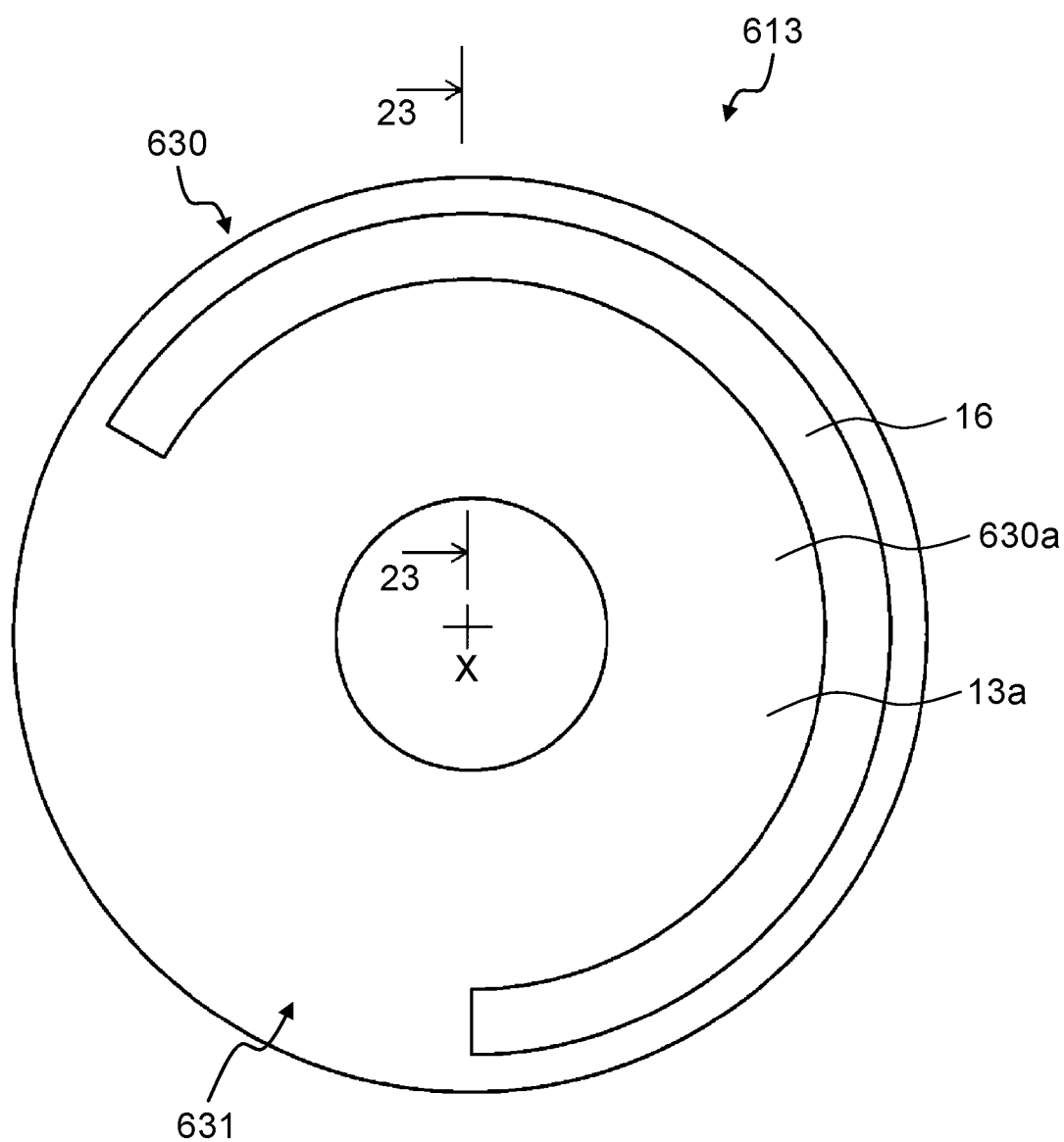
FIG. 22 is a plan view showing a first face side of a phosphor wheel in a sixth exemplary embodiment.
Figure 23:
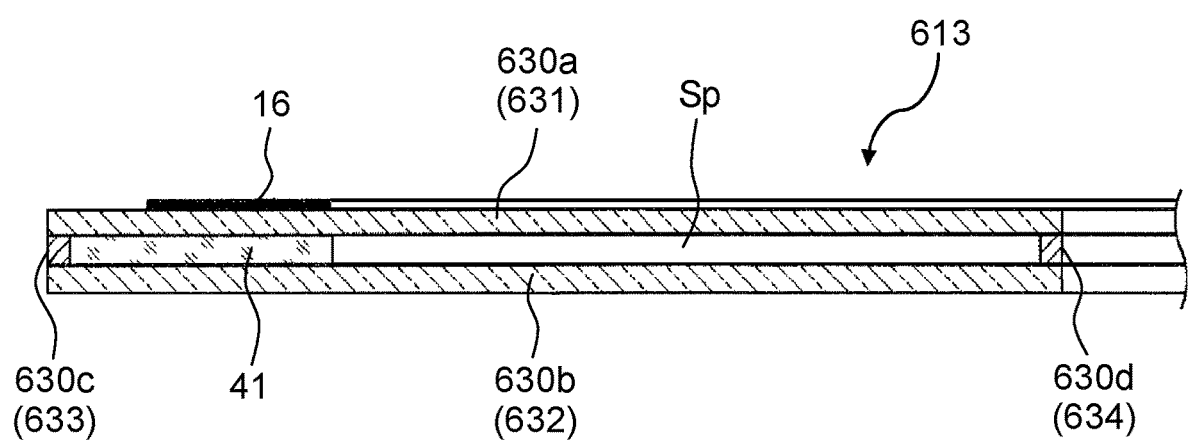
FIG. 23 is a cross-sectional view of the phosphor wheel in the sixth exemplary embodiment.

FIG. 22 is a plan view showing a first face side of a phosphor wheel in the sixth exemplary embodiment. FIG. 23 is a cross-sectional view of the phosphor wheel in the sixth exemplary embodiment. FIG. 23 is a view showing a cross-section of phosphor wheel 613 in a rotation state taken along line 23 to 23 in FIG. 22.

In phosphor wheel 613 of the present exemplary embodiment, first disk portion 630a and second disk portion 630b of disk-shaped member 630 are constituted by first disk member 631 and second disk member 632, both of which are formed of a light transmitting material, respectively. The light transmitting material is glass, for example. Further, outer circumferential face portion 630c is constituted by outer circumferential spacer member 633, and inner circumferential face portion 630d is constituted by inner circumferential spacer member 634. Outer circumferential spacer member 633 and inner circumferential spacer member 634 each are, for example, a ring-shaped member formed of glass. First disk member 631 and second disk member 632 are bonded to each other via outer circumferential spacer member 633 and inner circumferential spacer member 634 to constitute phosphor wheel 613 that has enclosed space Sp thereinside. Coolant 41 is sealed into enclosed space Sp.

Further, phosphor layer 16 has an arc shape centered on rotation axis X, and is formed on first face 13a of first disk portion 630a.

Figure 24:
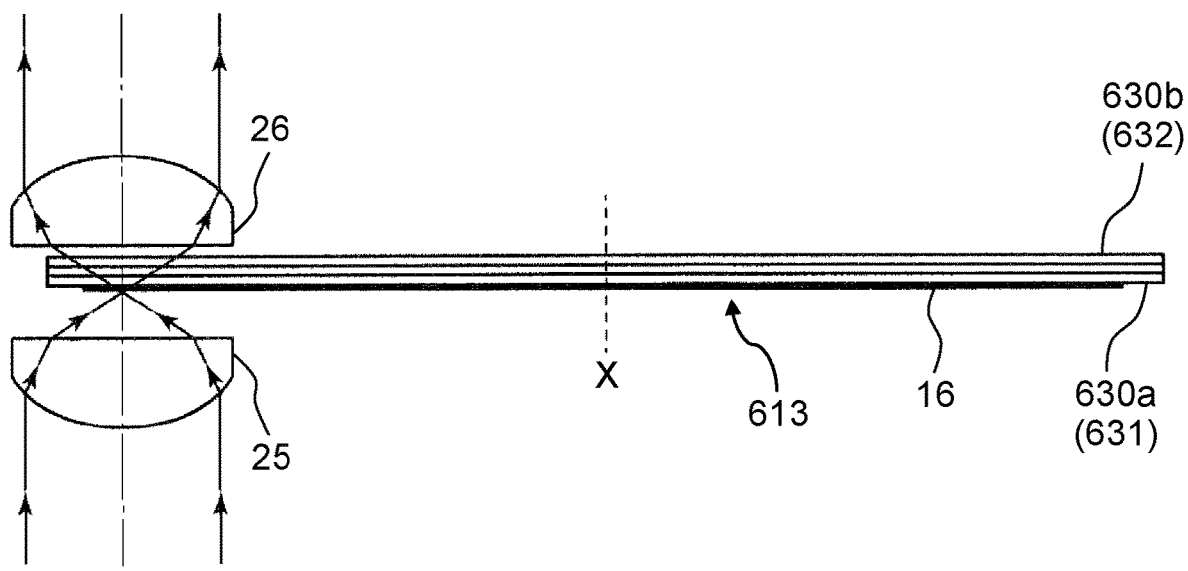
FIG. 24 is a side view of the phosphor wheel in the sixth exemplary embodiment.

FIG. 24 is a side view of the phosphor wheel in the sixth exemplary embodiment. In phosphor wheel 613, a blue laser beam converged by first optical lens 25 is emitted on phosphor layer 16 and subjected to wavelength conversion. After that, the conversion light beam passes through first disk portion 630a, coolant 41 in enclosed space Sp, and second disk portion 630b, and then reaches second optical lens 26. On the other hand, the blue laser beam emitted on an area in which phosphor layer 16 is not provided on first face 13a of first disk portion 630a passes through first disk portion 630a, coolant 41 in enclosed space Sp, and second disk portion 630b without being subjected to wavelength conversion, and then reaches second optical lens 26. Note that, the blue laser beam, which excites phosphor layer 16, and light beams (red, green) excited by the blue laser beam passed through coolant 41. Therefore, a transparent and colorless material must be employed as coolant 41. For instance, coolant 41 may be water or the like.

Note that, in the present exemplary embodiment, an airflow opening like the fourth exemplary embodiment may be provided in disk-shaped member 630 of phosphor wheel 613. By providing the airflow opening, the same effect as in the fourth exemplary embodiment is obtained.

Seventh Exemplary Embodiment

A seventh exemplary embodiment will be described. The seventh exemplary embodiment will be described focusing on a difference from the first exemplary embodiment.

Figure 25:
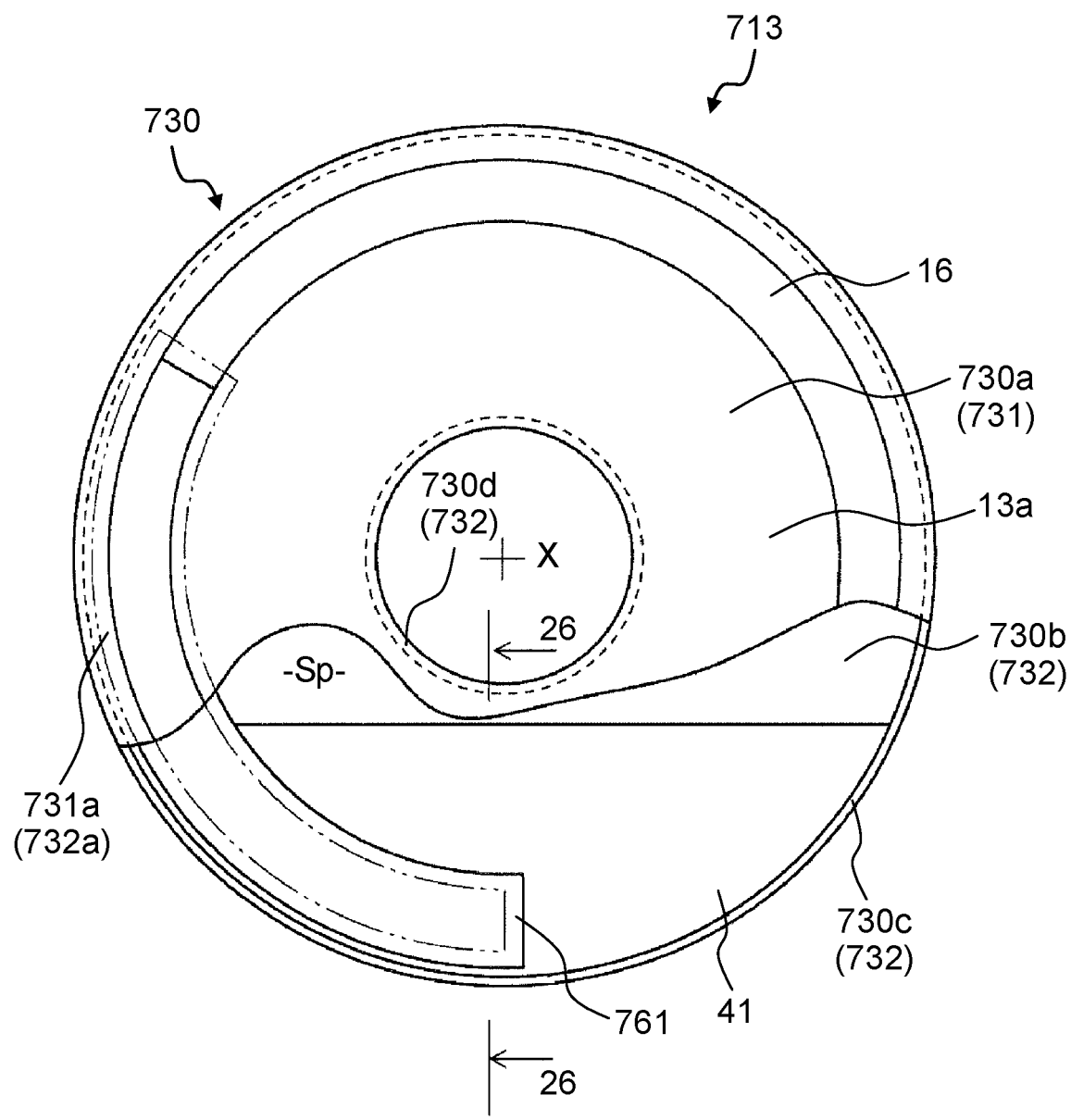
FIG. 25 is a plan view showing a first face side of a phosphor wheel in a seventh exemplary embodiment.
Figure 26:
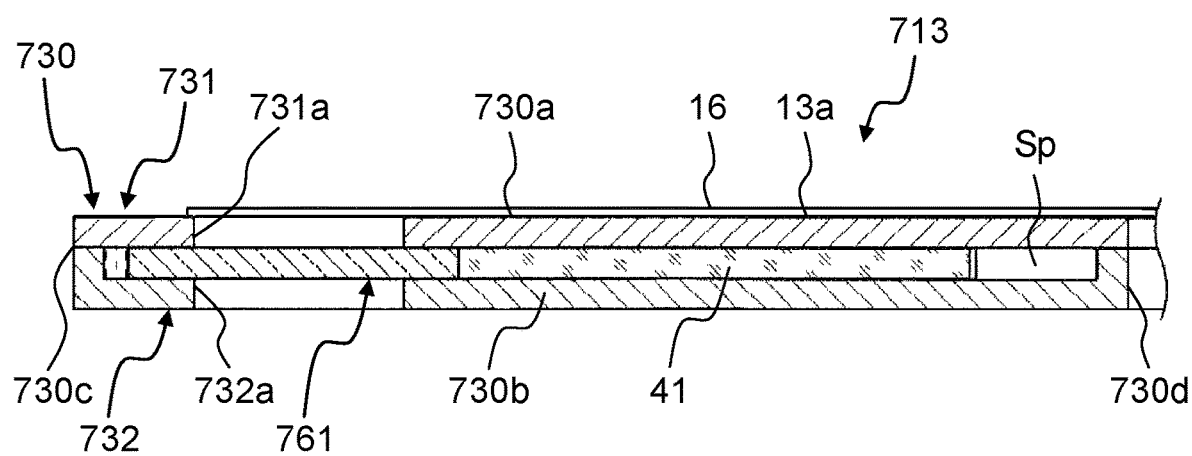
FIG. 26 is a cross-sectional view of the phosphor wheel in the seventh exemplary embodiment.

FIG. 25 is a plan view showing a first face side of a phosphor wheel in the seventh exemplary embodiment. FIG. 26 is a cross-sectional view of the phosphor wheel in the seventh exemplary embodiment. FIG. 26 is a view showing a cross-section of phosphor wheel 713 taken along line 26 to 26 in FIG. 25.

In the present exemplary embodiment, the optical system of FIG. 24 is employed. In phosphor wheel 713 of the present exemplary embodiment, phosphor layer 16 has an arc shape centered on rotation axis X. Disk-shaped member 730 of phosphor wheel 713 is constituted by first disk member 731 and second disk member 732. First disk member 731 has first disk portion 730a. Second disk member 732 has second disk portion 730b, outer circumferential face portion 730c, and inner circumferential face portion 730d. Further, arc-shaped opening 731a of first disk portion 730a is provided in an arc-shaped area on which phosphor layer 16 is not disposed. Arc-shaped opening 732a of second disk portion 730b is provided in an area opposite to arc-shaped opening 731a in second disk portion 730b. Furthermore, between arc-shaped opening 731a and arc-shaped opening 732a, light transmission member 761, which is formed of a material transmitting a blue laser beam, is provided such that enclosed space Sp is partially filled with light transmission member 761.

According to the present exemplary embodiment, the blue laser beam that has illuminated phosphor layer 16 is subjected to wavelength conversion, and then emitted. On the other hand, the blue laser beam that has illuminated arc-shaped opening 731a, 732a in first face 13a of first disk portion 730a passes through light transmission member 761 without being subject to wavelength conversion, and then reaches second optical lens 26. Note that, if first face 13a of first disk portion 730a is configured to be a mirror face (reflective face), the light beam that has passed through phosphor layer 16 among the blue laser beams subjected to wavelength conversion can be reflected on first face 13a of first disk portion 730a and outputted.

Inside disk-shaped member 730 of phosphor wheel 713, the same structures as in the first to third exemplary embodiments are applicable to an area in which light transmission member 761 is not provided, and the same effect will be obtained, if applied. Further, an airflow opening like the fourth exemplary embodiment may be provided. By providing the airflow opening, the same effect as in the fourth exemplary embodiment is obtained.

Other Exemplary Embodiments

As mentioned above, one exemplary embodiment of the present disclosure has been described, but the present disclosure is not limited to the above-mentioned exemplary embodiment, and various modifications may be made without departing from the scope of the disclosure.

(A)

In the above-mentioned exemplary embodiment, it is illustrated, by example, that the phosphor wheel and the light conversion device of the present disclosure are mounted on projector 100 of a three-chip DLP type including three DMDs 7. The present disclosure, however, is not limited to this. For instance, the phosphor wheel and light conversion device of the present disclosure may be mounted on a projector of a one-chip DLP type in which a single DMD and a color wheel are combined.

(B)

In the above-mentioned exemplary embodiment, it is illustrated, by example, that the phosphor wheel and light conversion device of the present disclosure are mounted on projector 100 of a DLP type. The present disclosure, however, is not limited to this. For instance, the phosphor wheel and the light conversion device of the present disclosure may be mounted on a liquid crystal type of projector using LCD (Liquid Crystal Display) or LCOS (Liquid Crystal on Silicon).

(C)

The above-mentioned exemplary embodiments have been described on the assumption that phosphor layer 16 is formed of one kind of fluorescent substance. But, the present disclosure is not limited to this. The present disclosure is also applicable to a phosphor wheel configured such that phosphor layer 16 is made of two or more kinds of fluorescent substances having different wavelength conversion characteristics and the two or more kinds of phosphor layers are divided in a circumferential direction.

(D)

In the above-mentioned exemplary embodiment, as the projection display apparatus in accordance with the present disclosure, projector 100 is illustrated, by example. The present disclosure, however, is not limited to this. For instance, the present disclosure may be applied to other projection display apparatuses, such as a rear projection television, other than projector 100.

INDUSTRIAL APPLICABILITY

The phosphor wheel of the present disclosure has an effect in which a cooling effect is more improved than before, and thus is widely available in a phosphor wheel device equipped with a phosphor wheel of which the heat generated in a fluorescent substance is enlarged due to an increase in brightness, a light conversion device, and a projection display apparatus.

What is claimed is:

1. A phosphor wheel comprising:
a disk-shaped member rotatable about a rotation axis; and
a phosphor layer disposed on an outer face of the disk-shaped member,
wherein the disk-shaped member has a hollow-box structure forming an enclosed space, and
wherein a coolant is sealed inside the enclosed space with the phosphor layer outside the enclosed space, the coolant evaporating to a gas state from a liquid state at more than or equal to a predetermined temperature and having a volume, in the liquid state, smaller than a capacity of the enclosed space.

2. The phosphor wheel according to claim 1, wherein the phosphor layer has an annular shape or an arc shape centered on the rotation axis, the enclosed space is an annular space centered on the rotation axis, and when the disk-shaped member is rotated about the rotation axis and the coolant in the liquid state is distributed annularly toward an outer circumferential side of the enclosed space due to rotational centrifugal force, the volume of the coolant is determined such that at least an area irradiated with a laser beam in the phosphor layer overlaps a distribution area of the coolant in the liquid state, which is distributed annularly, when viewed along a direction of the rotation axis.

3. The phosphor wheel according to claim 1, wherein the phosphor layer has an annular shape or an arc shape centered on the rotation axis, the enclosed space is an annular space centered on the rotation axis, and when the disk-shaped member is rotated about the rotation axis and the coolant in the liquid state is distributed annularly toward an outer circumferential side of the enclosed space due to rotational centrifugal force, the volume of the coolant is determined such that an entire area of the phosphor layer overlaps a distribution area of the coolant in the liquid state, which is distributed annularly, when viewed along a direction of the rotation axis.

4. The phosphor wheel according to claim 1, wherein the phosphor layer has an annular shape or an arc shape centered on the rotation axis, and the enclosed space is an annular space centered on the rotation axis, and
the phosphor wheel further comprising a porous body i-s-disposed in an area at which the phosphor layer is projected onto the enclosed space in a direction of the rotation axis.

5. The phosphor wheel according to claim 4, wherein the disk-shaped member has a first disk portion having the outer face on which the phosphor layer is disposed, and a second disk portion facing the first disk portion via the enclosed space, and the porous body is fixed to the first disk portion and faces the second disk portion via a gap.

6. The phosphor wheel according to claim 5, wherein the first disk portion is between the phosphor layer and the porous body.

7. The phosphor wheel according to claim 4, wherein the porous body is formed of copper or silver.

8. The phosphor wheel according to claim 1, wherein an airflow opening is formed through the disk-shaped member in parallel with a direction of the rotation axis while maintaining a seal of the enclosed space.

9. The phosphor wheel according to claim 1, wherein an entirety or a part of the outer face on which the phosphor layer is disposed is configured to be a mirror face that reflects light.

10. The phosphor wheel according to claim 1, wherein the disk-shaped member has a first disk portion having the outer face on which the phosphor layer is disposed, and a second disk portion facing the first disk portion via the enclosed space, and the first disk portion and the second disk portion are formed of a material that transmits light.

11. The phosphor wheel according to claim 10, wherein the coolant transmits laser light that excites the phosphor layer, and light excited by the laser light.

12. The phosphor wheel according to claim 11, wherein the coolant is water.

13. The phosphor wheel according to claim 1, wherein the disk-shaped member has a first disk portion having the outer face on which the phosphor layer is disposed, and a second disk portion facing the first disk portion via the enclosed space,
the first disk portion and the second disk portion are formed of a material that does not transmit light,
the phosphor layer has an arc shape centered on the rotation axis,
an arc-shaped opening is provided in a remaining arc area on which the phosphor layer is not disposed in the first disk portion, and an area faces the remaining arc area in the second disk portion, and
a light transmission member formed by a material that transmits light is provided in a position of the arc-shaped opening.

14. The phosphor wheel according to claim 1, wherein the predetermined temperature is higher than a temperature of the coolant before the phosphor layer is excited by a laser beam, and lower than a temperature of the coolant after the phosphor layer has been excited by the laser beam.

15. The phosphor wheel according to claim 1, wherein the predetermined temperature is in a range from 70° C. to 160° C., inclusive.

16. The phosphor wheel according to claim 1, wherein the enclosed space has a pressure ranging from 500 hPa to 2000 hPa.

17. A light conversion device comprising:
   the phosphor wheel according to claim 1; and
   a light source configured to emit light exciting the phosphor layer of the phosphor wheel.

18. The phosphor wheel according to claim 1, wherein the volume of the coolant is smaller than half of the capacity of the enclosed space.

19. A phosphor wheel comprising:
   a disk-shaped member rotatable about a rotation axis; and
   a phosphor layer disposed on one face of the disk-shaped member,
   wherein the disk-shaped member has a hollow-box structure forming an enclosed space,
   wherein a coolant is sealed inside the enclosed space, the coolant evaporating to a gas state from a liquid state at more than or equal to a predetermined temperature and having a volume, in the liquid state, smaller than a capacity of the enclosed space, and
   wherein the disk-shaped member is configured such that the coolant in the liquid state flows into an outer circumferential portion of the enclosed space during rotation of the disk-shaped member, and a ladle-shaped portion is provided to accumulate the coolant that has flowed into the outer circumferential portion.

20. A light conversion device comprising:
   the phosphor wheel according to claim 19; and
   a light source configured to emit light exciting the phosphor layer of the phosphor wheel.

* * * * *